US012759158B2

(12) United States Patent
Kudo

(10) Patent No.: US 12,759,158 B2
(45) Date of Patent: Oct. 13, 2026

(54) ROBOT, METHOD FOR CONTROLLING ROBOT, AND NON-TRANSITORY COMPUTER-READABLE STORAGE MEDIUM STORING COMPUTER PROGRAM FOR CONTROLLING ROBOT

(71) Applicant: SEIKO EPSON CORPORATION, Tokyo (JP)

(72) Inventor: Makoto Kudo, Fujimi-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 21 days.

(21) Appl. No.: 19/079,141

(22) Filed: Mar. 13, 2025

(65) Prior Publication Data

US 2025/0289138 A1 Sep. 18, 2025

(30) Foreign Application Priority Data

Mar. 14, 2024 (JP) ................................ 2024-039791

(51) Int. Cl.
*B25J 9/16* (2006.01)
*B25J 13/06* (2006.01)

(52) U.S. Cl.
CPC ........... *B25J 9/1692* (2013.01); *B25J 9/1602* (2013.01); *B25J 9/1664* (2013.01); *B25J 13/06* (2013.01)

(58) Field of Classification Search
CPC ...... B25J 9/1692; B25J 9/1602; B25J 9/1664; B25J 13/06; B25J 9/0081; B25J 9/16
See application file for complete search history.

(56) References Cited

U.S. PATENT DOCUMENTS 6,343,242 B1 * 1/2002 Nomura ................. B25J 13/088
901/34
11,738,468 B2 * 8/2023 Hashimoto .............. B25J 13/02
700/264

(Continued)

FOREIGN PATENT DOCUMENTS

JP 2011224694 A 11/2011

OTHER PUBLICATIONS

Nguyen et al., Hybrid Vibration Control Algorithm of a Flexible Manipulator System, May 15, 2023, MDPI, Robotics 2023, pp. 1-17 ( Year: 2023).*

(Continued)

*Primary Examiner* — Sze-Hon Kong
(74) *Attorney, Agent, or Firm* — The Sun IP Law

(57) ABSTRACT

A robot system includes an arm, one or more motors that move the arm according to a drive signal, a controller that controls the one or more motors, and an input section. The controller includes one or more sets including a filtering section that filters a position command to generate a filtered command and a drive signal generator that generates the drive signal using the filtered command. The filtering section includes a band-stop filter and a low-pass filter having a variable cutoff frequency. The cutoff frequency is set to a first frequency when an instruction to prioritize an operating speed is received, and the cutoff frequency is set to a second frequency lower than the first frequency when an instruction to prioritize suppression of vibration out of the suppression of vibration of the arm and the operating speed of the arm is received.

15 Claims, 10 Drawing Sheets

(56) References Cited

U.S. PATENT DOCUMENTS

| | | | | |
|---|---|---|---|---|
| 2014/0039678 | A1* | 2/2014 | Motoyoshi | B25J 9/1641 700/258 |
| 2015/0120050 | A1* | 4/2015 | Gomi | B25J 18/04 700/258 |
| 2019/0217469 | A1* | 7/2019 | Ichinose | B25J 9/1651 |
| 2019/0308316 | A1* | 10/2019 | Washizu | B25J 9/1664 |
| 2020/0023515 | A1* | 1/2020 | Hirabayashi | B25J 9/1694 |
| 2020/0023525 | A1* | 1/2020 | Miyamoto | B25J 13/087 |
| 2020/0306961 | A1* | 10/2020 | Hiraide | B25J 9/1628 |
| 2021/0060784 | A1* | 3/2021 | Kinugasa | B25J 13/085 |
| 2022/0176557 | A1* | 6/2022 | Nakata | B25J 9/1641 |
| 2022/0305651 | A1* | 9/2022 | Toshimitsu | B25J 9/1615 |
| 2025/0091215 | A1* | 3/2025 | Yang | B25J 9/1641 |

OTHER PUBLICATIONS

Nguyen et al., Active vibration suppression in robotic milling using optimal control, Mar. 2, 2020, Elsevier, International Journal of Machine Tools and Manufacture, pp. 1-11 (Year: 2020).*

* cited by examiner

FIG. 14

| COEFFICIENT | 0.8 | 0.85 | 0.9 | 0.95 | 1.0 | 1.1 | 1.2 | 1.3 | 1.4 | 1.5 |
|---|---|---|---|---|---|---|---|---|---|---|
| CYCLE TIME | 586 | 569 | 554 | 538 | 522 | 494 | 461 | 436 | 418 | 410 |
| OVERSHOOT | 25 | 23 | 35 | 50 | 60 | 100 | 120 | 180 | 250 | 350 |
| PEAK TORQUE | 0.624 | 0.645 | 0.658 | 0.676 | 0.68 | 0.711 | 0.717 | 0.741 | 0.747 | 0.759 |
| | | | | 50 μM OR LESS | | 100 μM OR LESS | | | 300 μM OR LESS | |

ROBOT, METHOD FOR CONTROLLING ROBOT, AND NON-TRANSITORY COMPUTER-READABLE STORAGE MEDIUM STORING COMPUTER PROGRAM FOR CONTROLLING ROBOT

CROSS-REFERENCE TO RELATED APPLICATIONS

The present application is based on, and claims priority from JP Application Serial Number 2024-039791, filed Mar. 14, 2024, the disclosure of which is hereby incorporated by reference herein in its entirety.

BACKGROUND OF THE INVENTION

1. Technical Field

The present disclosure relates to a robot, a method for controlling a robot, and a non-transitory computer-readable storage medium storing a computer program for controlling a robot.

2. Related Art

In the related art, there is a technique for reducing residual vibration in a robot. In a technique disclosed in JP-A-2011-224694, the following processing is performed. A first low-pass filter which is a low-pass filter having a low cutoff frequency is applied to a speed command profile generated in accordance with a constant acceleration method by setting an operating speed to a maximum speed, and an acceleration/deceleration time when the first low-pass filter is applied is obtained. The acceleration/deceleration time includes an acceleration time and a deceleration time. In the constant acceleration method, the acceleration time and the deceleration time are the same value. A second low-pass filter which is a low-pass filter having a high cutoff frequency is applied to the speed command profile generated in accordance with the constant acceleration method, and an acceleration/deceleration time when the second low-pass filter is applied is obtained. The acceleration/deceleration times are compared with each other, and processing for the generation of the speed command profile in accordance with the constant acceleration method, the calculation of the acceleration/deceleration time in the case of applying the first low-pass filter, and the calculation of the acceleration/deceleration time in the case of applying the second low-pass filter is repeated while adjusting the acceleration/deceleration times until both the acceleration/deceleration times become the same value. As a result, by applying the low-pass filter having the high cutoff frequency, it is possible to generate a speed command profile which has a deceleration time equivalent to that when the low-pass filter having the low cutoff frequency is applied, and is unlikely to cause stop vibration to occur.

However, in the technique disclosed in JP-A-2011-224694, it is not possible to reflect user's intention as to which of the positional accuracy and the processing time, which are unlikely to be compatible with each other in the operation of the robot, is to be prioritized. For this reason, in the technology disclosed in JP-A-2011-224694, it is not possible to determine an operation for achieving appropriate position accuracy and processing time according to work that the robot performs, while reflecting the user's intention.

SUMMARY OF THE INVENTION

An advantage of some aspects of the present disclosure is to solve at least some of the problems described above, and the present disclosure can be implemented as the following aspects.

According to an aspect of the present disclosure, a robot system is provided. The robot system includes an arm, one or more motors that move the arm according to a drive signal, a controller that controls the one or more motors, and an input section that receives an instruction from an outside. The controller includes one or more sets including a filtering section that filters a position command to generate a filtered command, and a drive signal generator that generates the drive signal using the filtered command. The filtering section includes a band-stop filter that is used for the filtering and a low-pass filter that is used for the filtering and has a variable cutoff frequency. The cutoff frequency is set to a first frequency when an instruction to prioritize an operating speed out of suppression of vibration of the arm and the operating speed of the arm is received, and the cutoff frequency is set to a second frequency lower than the first frequency when an instruction to prioritize the suppression of vibration out of the suppression of vibration of the arm and the operating speed of the arm is received.

BRIEF DESCRIPTION OF DRAWINGS

FIG. 14 is a table illustrating processing of changing cutoff frequencies in step S136 and results of the processing.

DETAILED DESCRIPTION OF THE INVENTION

A. First Embodiment

A1. Configuration and Operation in First Embodiment

Figure 1:
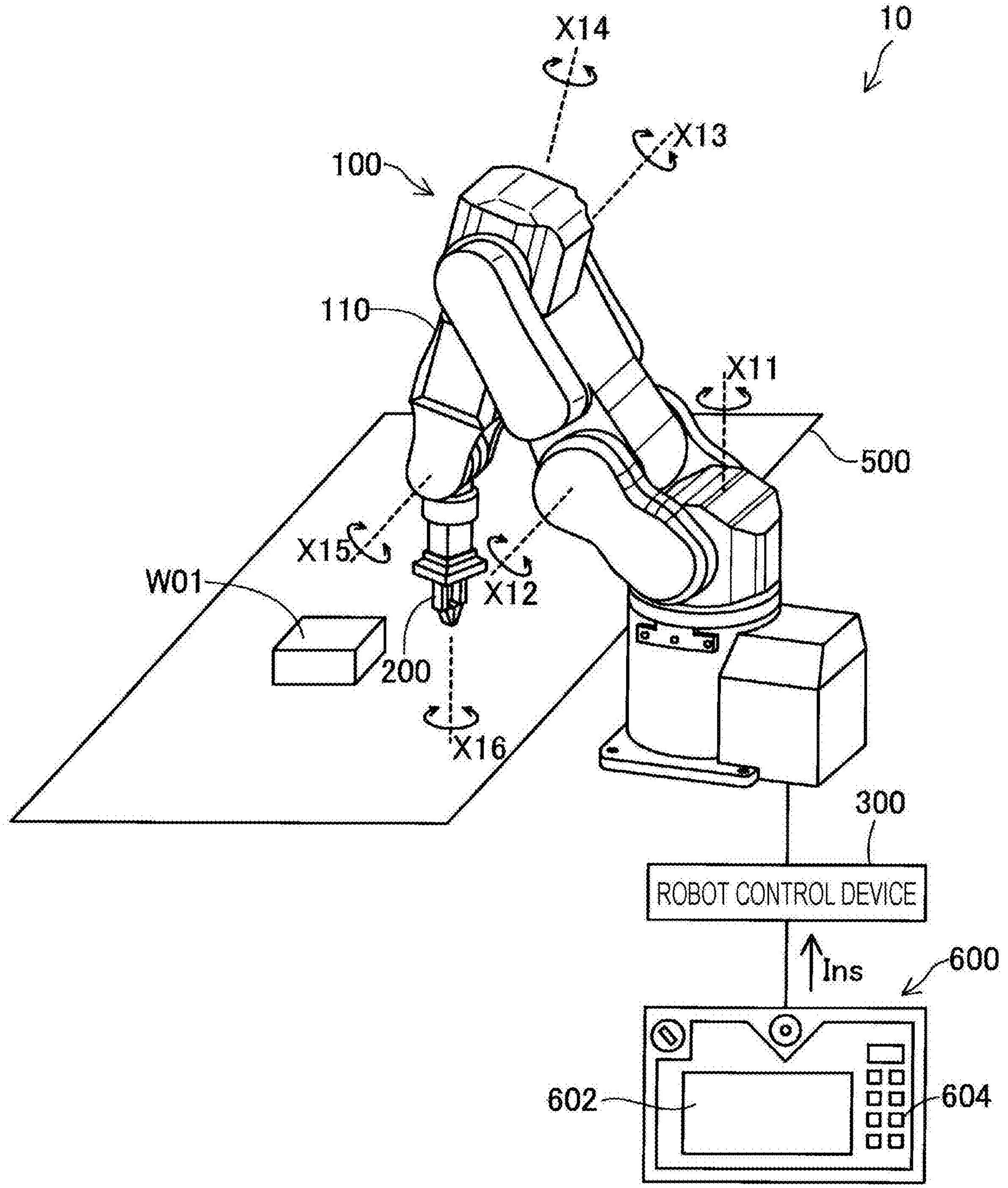
FIG. 1 is an explanatory diagram illustrating a robot system according to an embodiment.

FIG. 1 is an explanatory diagram illustrating a robot system 10 according to an embodiment. The robot system 10 according to the present embodiment includes a robot 100, an end effector 200, a robot control device 300, and a robot teaching device 600.

The robot 100 is a six-axis robot including an arm 110 having six rotary joints X11 to X16 (see the upper portion of FIG. 1). The joints X11, X14, and X16 are torsional joints. The joints X12, X13, and X15 are bending joints. The arm 110 of the robot 100 is driven by rotating the six joints X11 to X16 by respective servo motors 410. That is, the six servo motors 410 move the arm 110 according to a drive signal xd. As a result, the end effector 200 attached to a distal end of the arm 110 can be positioned in a designated posture at a designated position in a three-dimensional space.

A workpiece W01 is an object on which the robot 100 performs work (see the middle central portion of FIG. 1). The workpiece W01 is put on a support table 500.

The robot control device 300 is coupled to the robot 100 via an interface (see the lower right portion of FIG. 1). The robot control device 300 controls an operation of the robot 100. To be more specific, the robot control device 300 controls and drives the servo motors 410 as actuators that move the joints X11 to X16 of the robot 100.

Figure 2:
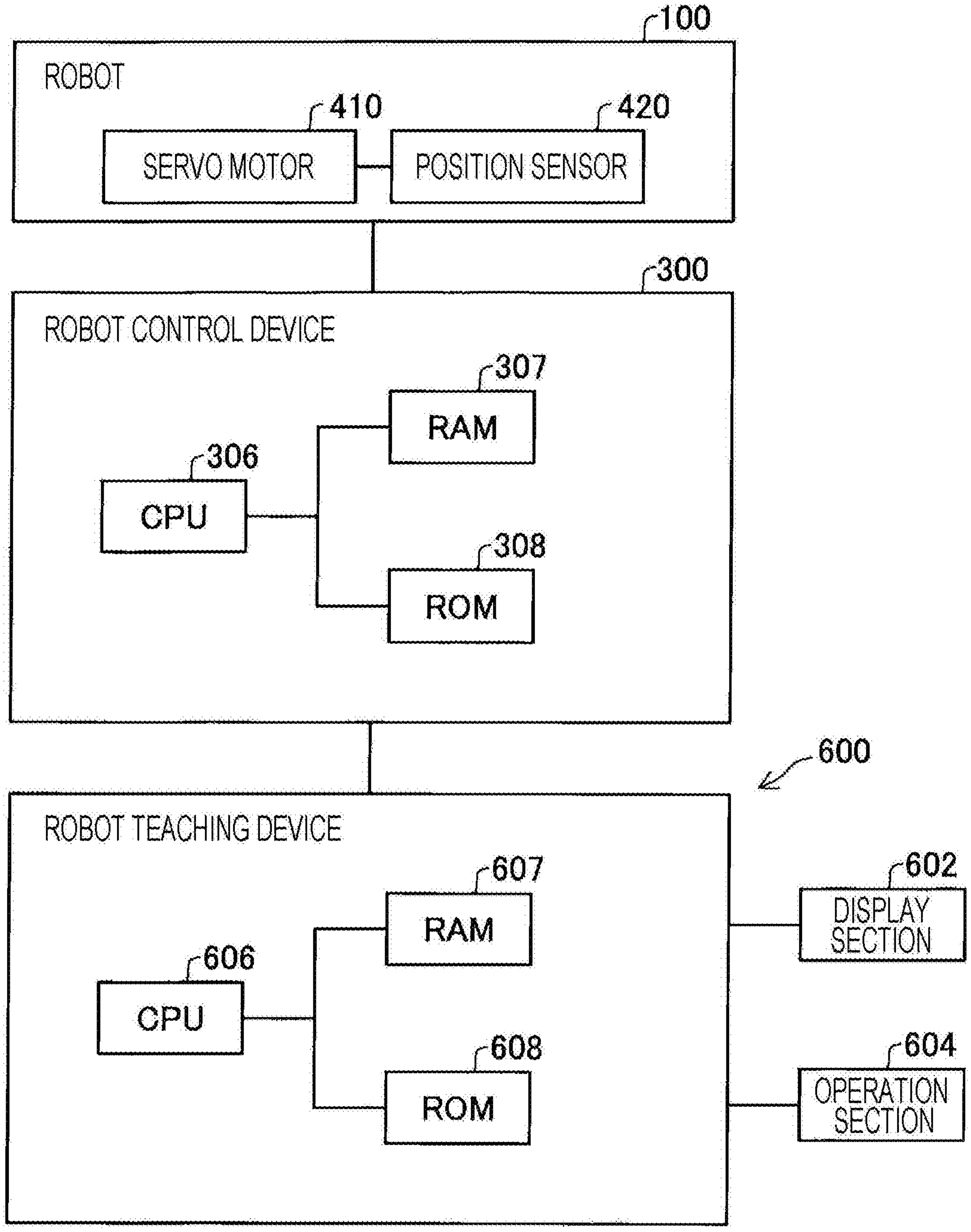
FIG. 2 is a block diagram illustrating each of configurations of a robot, a robot control device, and a robot teaching device.

FIG. 2 is a block diagram illustrating each of configurations of the robot 100, the robot control device 300, and the robot teaching device 600. The robot control device 300 is a computer including a CPU 306 which is a processor, a RAM 307, and a ROM 308 (see the middle portion of FIG. 2). The RAM 307 includes a main memory which is a semiconductor memory and a hard disk which is an auxiliary storage device. The CPU 306 implements various functions for controlling the robot by loading a computer program stored in the hard disk into the main memory and executing the computer program. The robot control device 300 is coupled to the robot teaching device 600 via an interface.

The robot teaching device 600 teaches, to the robot control device 300, an operation to be designated for the robot 100. Before the actual operation of the robot 100, first, the robot teaching device 600 teaches the operation of the robot 100. The robot control device 300 stores a result of the teaching in the RAM 307 as data. The robot control device 300 controls the robot 100 based on the data representing the result of the teaching stored in the RAM 307 at the stage of operating the robot 100.

The robot teaching device 600 receives an instruction regarding the operation of the robot from the outside (see the lower right portion of FIG. 1). The robot teaching device 600 is a computer including a display section 602 and an operation section 604. The display section 602 is capable of displaying information. Specifically, the display section 602 is a liquid crystal display capable of displaying a character and an image. The operation section 604 receives an instruction from a user. Specifically, the operation section 604 includes a numeric keypad for inputting a number, a cursor key for designating a position, and an enter key for confirming an input.

The robot teaching device 600 includes a CPU 606 which is a processor, a RAM 607, and a ROM 608 (see the lower portion of FIG. 2). The RAM 607 includes a main memory which is a semiconductor memory and a hard disk which is an auxiliary storage device. The CPU 606 implements various functions for designating an operation of the robot 100 by loading a computer program stored in the hard disk into the main memory and executing the computer program. The robot teaching device 600 is coupled to the robot control device 300 via an interface.

The robot teaching device 600 can receive, for example, an instruction to prioritize an operating speed out of suppression of vibration of the arm 110 and the operating speed of the arm 110. The robot teaching device 600 can receive an instruction to prioritize the suppression of vibration out of the suppression of vibration of the arm 110 and the operating speed of the arm 110. The display and the input in the robot teaching device 600 will be described later.

The end effector 200 is attached to the distal end of the arm 110 (see the middle central portion of FIG. 1). Under control by the robot control device 300, the end effector 200 can grip the workpiece W01 on the support table 500 and release the gripped workpiece W01. As a result, for example, the robot 100 and the end effector 200 can be controlled by the robot control device 300 to grip the workpiece W01 on the support table 500 and move the workpiece W01.

Figure 3:
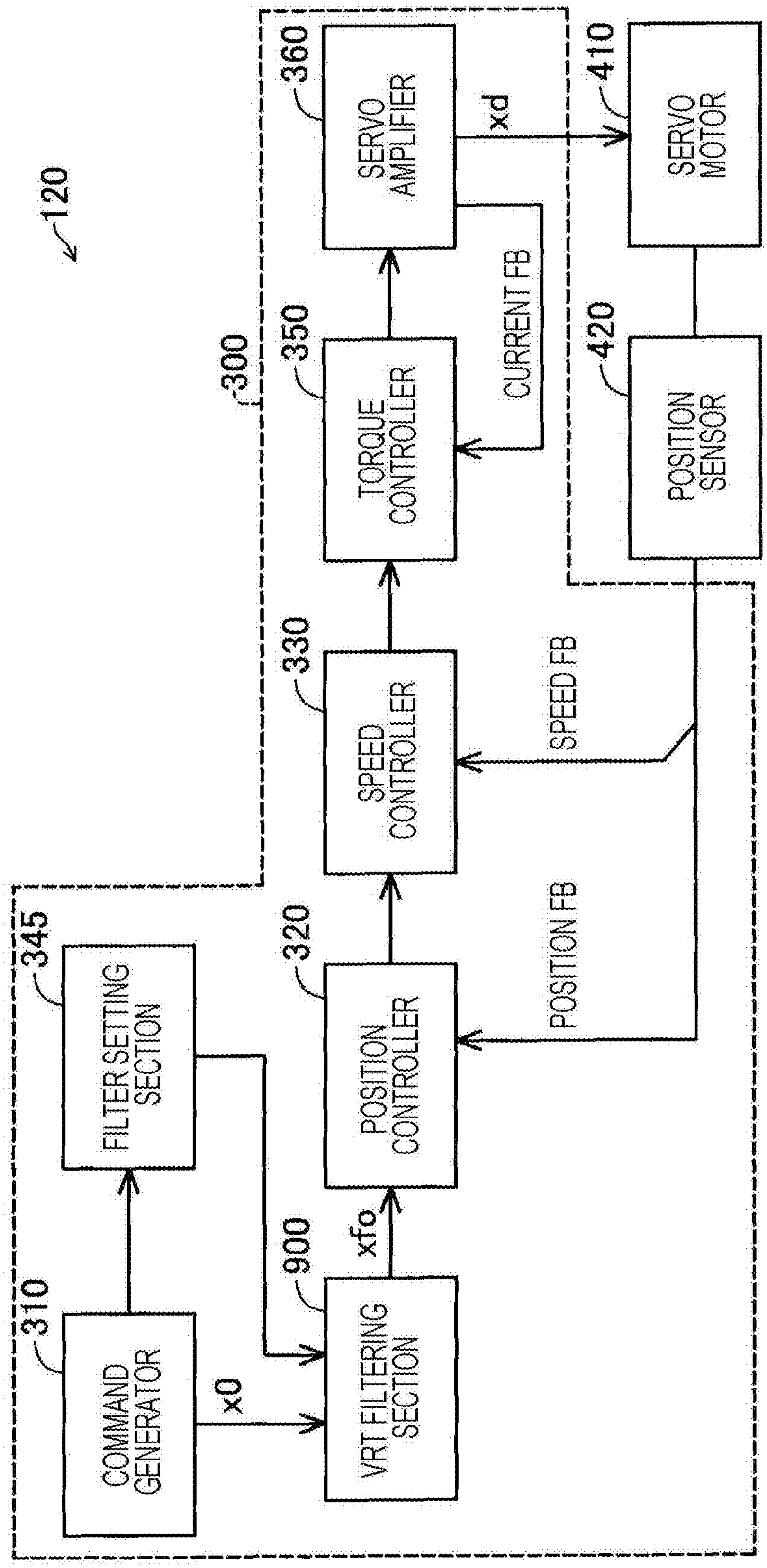
FIG. 3 is a block diagram illustrating a relationship between functional sections of the robot control device and components of the robot.

FIG. 3 is a block diagram illustrating a relationship between functional sections of the robot control device 300 and components of the robot 100. The robot control device 300 includes a command generator 310, a filter setting section 345, a VRT filtering section 900, a position controller 320, a speed controller 330, a torque controller 350, and a servo amplifier 360. The sections of the robot control device 300 illustrated in FIG. 3, and a servo motor 410 and a position sensor 420 of the robot 100 are collectively referred to as a "motor unit 120".

Position sensors 420 are attached to the respective servo motors 410 that drive the joints of the robot 100 (see the middle right portion of FIG. 3 and the upper portion of FIG. 2). The position sensors 420 detect rotational positions and rotational speeds of the respective servo motors 410 and transmit the rotational positions and the rotational speeds to the robot control device 300. The robot control device 300 executes feedback control using the outputs of the position sensors 420 (see the lower middle portion of FIG. 3).

The command generator 310 generates a position command x0 indicating a target position at which the end effector 200 is to be positioned, and outputs the position command x0 to the VRT filtering section 900 (see the upper left portion of FIG. 3). In addition, the command generator 310 outputs a command indicating an operation being executed by the robot 100 to the filter setting section 345.

The filter setting section 345 receives, from the robot teaching device 600, an instruction Ins to prioritize one of the suppression of vibration of the arm 110 and the operating speed of the arm 110 in advance before the execution of the operation by the robot 100 (see the upper left portion of FIG. 3 and the lower right portion of FIG. 1).

When the operation by the robot 100 is executed, the filter setting section 345 receives, from the command generator 310, the command indicating the operation being executed (see the upper left portion of FIG. 3). The filter setting section 345 generates and outputs a command designating one or more frequencies to be removed from the position command x0 according to the command received from the command generator 310 and the instruction Ins received from the robot teaching device 600.

The VRT filtering section 900 receives the position command x0 from the command generator 310 (see the middle left portion of FIG. 3). The VRT filtering section 900 receives, from the filter setting section 345, the command designating the one or more frequencies to be removed. The VRT filtering section 900 generates and outputs a new position command by filtering the position command x0 output by the command generator 310 to remove a frequency component designated by the filter setting section 345 during the execution of the operation by the robot 100. The new position command generated by the VRT filtering section 900 is referred to as a filtered command xfo.

Portions of the frequency component removed by the VRT filtering section 900 are frequency components determined in advance according to the command indicating the operation being executed. These frequencies are resonance frequencies in the operation of the robot 100 during the execution of the operation. The resonance frequencies in the operation of the robot 100 are, for example, (I) a resonance frequency of the robot 100 in the posture at the end of the operation, (ii) a resonance frequency of the robot 100 holding the workpiece W01 at the end of the operation when the robot 100 holds the workpiece W01 at the end of the operation, and the like. By performing such processing, it is possible to prevent the robot 100 from resonating at the resonance frequencies at the end of the operation.

The VRT filtering section 900 further reduces a component having a frequency equal to or higher than the designated one or more frequencies in accordance with the instruction Ins. As a result, the robot 100 is further less likely to vibrate.

Hereinafter, in the present specification, a technology of reducing a predetermined frequency component according to a command such as a position command, a torque command, a speed command, or the like to reduce resonance of a control target due to the frequency is referred to as a vibration reduction technology (VRT). An example of a specific configuration of the VRT filtering section 900 will be described later.

The position controller 320 receives the position command x0 processed by the VRT filtering section 900 (see the middle left portion of FIG. 3). In addition, the position controller 320 receives the rotational position of the corresponding servo motor 410 from the position sensor 420 of the robot 100 as position feedback. The position controller 320 generates and outputs a speed command for the corresponding servo motor 410 of the robot 100 based on the information received by the position controller 320.

The speed controller 330 receives the speed command from the position controller 320 (see the middle central portion of FIG. 3). In addition, the speed controller 330 receives the rotation speed of the corresponding servo motor 410 from the position sensor 420 of the robot 100 as speed feedback. The speed controller 330 generates and outputs a torque command based on the speed command and the rotation speed of the corresponding servo motor 410.

The torque controller 350 receives the torque command from the speed controller 330 (see the middle right portion of FIG. 3). In addition, the torque controller 350 receives, from the servo amplifier 360, a feedback signal indicating the amount of a current to be supplied to the corresponding servo motor 410. The torque controller 350 determines the amount of current to be supplied to the corresponding one of the servo motors 410 based on the torque command and the feedback signal indicating the amount of a current to be supplied to the corresponding servo motor 410, and drives each of the servo motors 410 via the servo amplifier 360.

The position controller 320, the speed controller 330, the torque controller 350, and the servo amplifier 360 function as a drive signal generator that generates a drive signal for the servo motor as the actuator by using the filtered command xfo generated by the VRT filtering section 900 (see the middle portion of FIG. 3).

FIG. 3 illustrates one motor unit 120 for easy understanding of the technique. However, in the robot 100 according to the present embodiment, six motor units 120 which are six sets are provided for the six servo motors 410 that rotate the respective joints X11 to X16.

Figure 4:
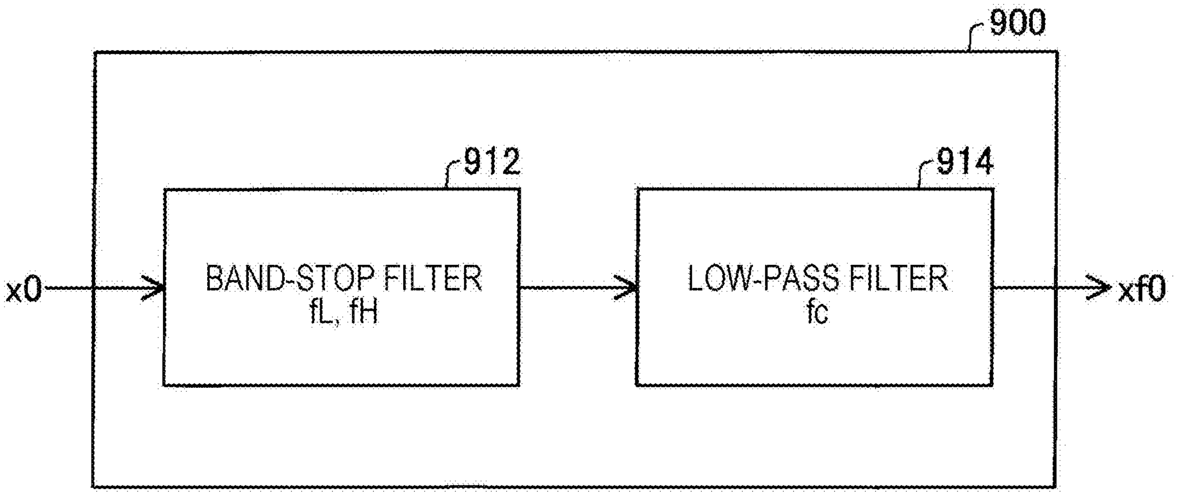
FIG. 4 is a block diagram illustrating a configuration of a VRT filtering section.

FIG. 4 is a block diagram illustrating a configuration of the VRT filtering section 900 (see the middle left portion of FIG. 3). The VRT filtering section 900 includes a band-stop filter 912 and a low-pass filter 914. The band-stop filter 912 and the low-pass filter 914 are used for filtering by the VRT filtering section 900.

With such a configuration, it is possible to further reduce resonance in the operation of the servo motor 410 according to the filtered command xfo in which a component of a target frequency fe is reduced, compared to an aspect in which the VRT filtering section 900 does not include a low-pass filter. However, the low-pass filter greatly delays the position command compared to the band-stop filter. For this reason, the adjustment of the characteristics of the low-pass filter to be applied to the position command greatly affects a cycle time of an operation of the robot and the amount of vibration in the operation of the robot.

The band-stop filter 912 reduces a component including the target frequency fe (see the left portion of FIG. 4). To be more specific, the band-stop filter 912 reduces, from an input signal, a frequency component that is in a band from a cutoff frequency fL to a cutoff frequency fH and includes the target frequency fe ($fL<fe<fH$). The cutoff frequencies fL and fH of the band-stop filter 912 are set according to the target frequency fe included in a command output from the filter setting section 345.

The low-pass filter 914 reduces a frequency component higher than a cutoff frequency fc from an input signal (see the right portion of FIG. 4). The cutoff frequency fc of the low-pass filter 914 may be variable. More specifically, the cutoff frequency fc of the low-pass filter 914 can be changed according to the instruction Ins input via the robot teaching device 600 and the filter setting section 345.

With such a configuration, it is possible to generate the drive signal xd for the robot while reflecting user's intention in the setting of the cutoff frequency fc of the low-pass filter 914.

On the other hand, the cutoff frequencies fL and fH of the band-stop filter 912 are not changed according to the instruction Ins input to the robot teaching device 600 (see the left portion of FIG. 4). In the present embodiment, by setting the target frequency fe reduced by the band-stop filter 912 to a resonance frequency of the robot, it is possible to generate the drive signal xd such that the robot does not greatly resonate regardless of the instruction Ins of the user.

Figure 5:
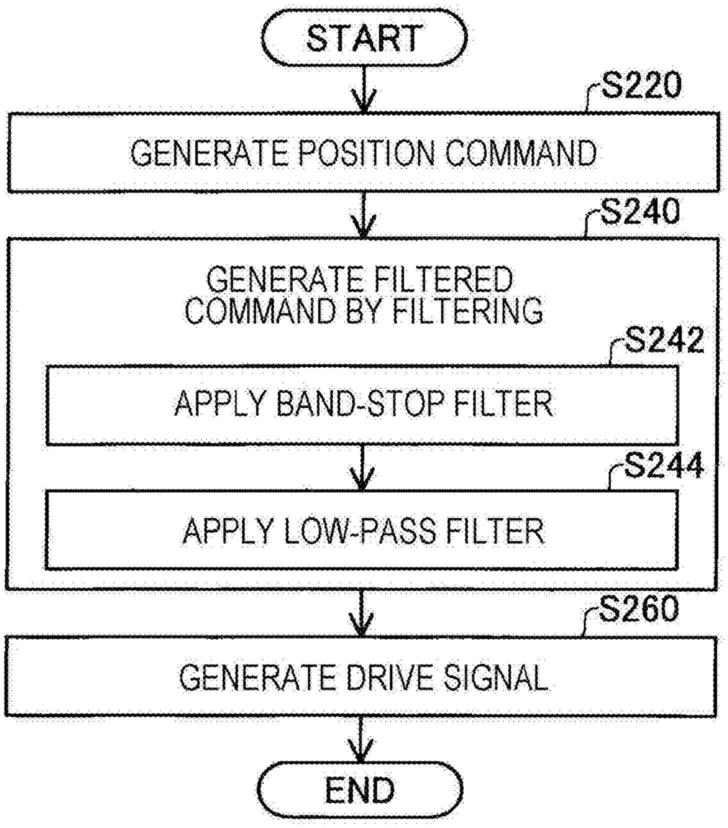
FIG. 5 is a flowchart for explaining a process that is executed in the robot control device.

FIG. 5 is a flowchart for explaining a process that is executed in the robot control device 300. A method for controlling the robot 100 is executed by the process illustrated in FIG. 5. A frequency reduced in each operation included in the work that the robot 100 performs is stored in the VRT filtering section 900 via the filter setting section 345 before the process illustrated in FIG. 5 (see the upper left portion of FIG. 3).

In order to facilitate the understanding of the technique, description will be made about the generation of a drive signal while focusing on only one servo motor 410 among the servo motors 410 disposed in the six joints X11 to X16. However, the process illustrated in FIG. 5 is executed in parallel for the six servo motors 410 disposed in the six joints X11 to X16.

In step S220, the command generator 310 generates the position command x0 (see the upper left portion of FIG. 3).

In step S240, the VRT filtering section 900 filters the position command x0 to generate the filtered command xfo (see the middle left portion of FIG. 3). In the present embodiment, in step S242, first, the band-stop filter 912 is applied to the position command x0. Thereafter, in step S244, the low-pass filter 914 is applied to the position command to which the band-stop filter 912 has been applied.

In step S260, the position controller 320, the speed controller 330, the torque controller 350, and the servo amplifier 360 that function as the drive signal generator generate the drive signal xd for the servo motor as the actuator by using the filtered command xfo generated by the VRT filtering section 900 (see the middle portion of FIG. 3).

Figure 6:
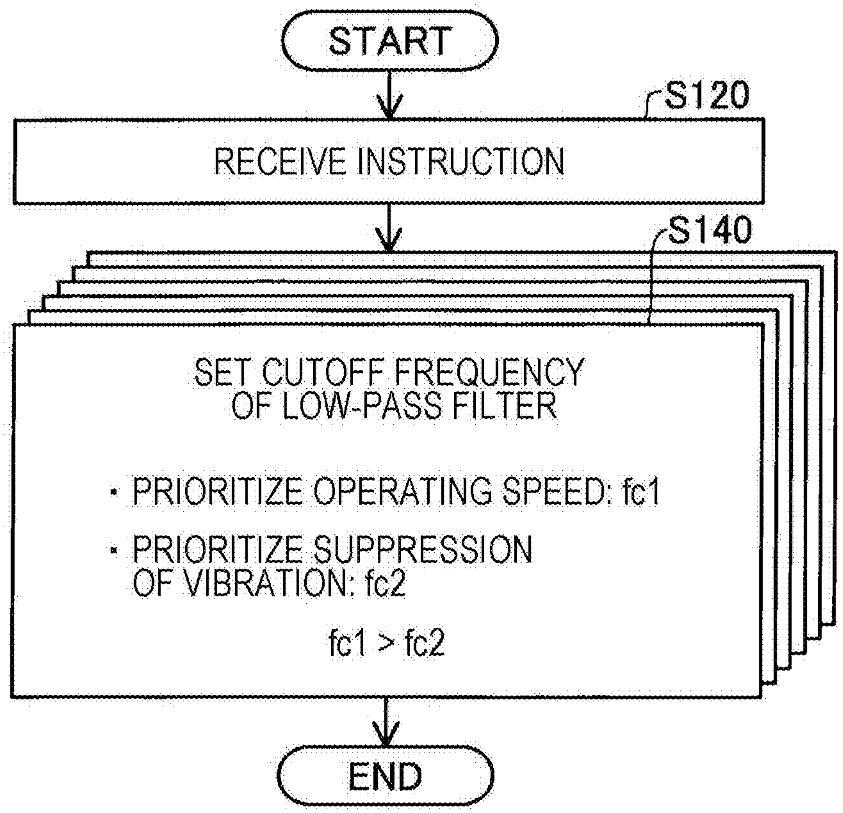
FIG. 6 is a flowchart illustrating a process that is executed in the robot teaching device and the robot control device.

FIG. 6 is a flowchart illustrating a process that is executed in the robot teaching device 600 and the robot control device 300 before the process illustrated in FIG. 5 in the robot 100 and the robot control device 300 (see the lower right portion of FIG. 1).

In step S120, the robot teaching device 600 receives an instruction from the user (see the lower right portion of FIG. 1). The VRT filtering section 900 of the robot control device 300 receives the instruction Ins from the user via the robot teaching device 600 (see the lower right portion of FIG. 1).

Figure 7:
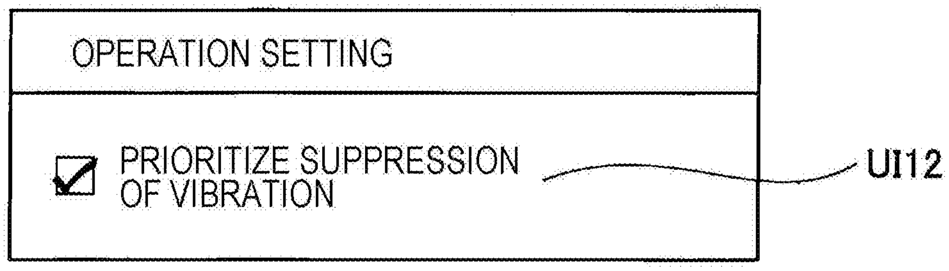
FIG. 7 is a diagram illustrating an image displayed on a display section of the robot teaching device in step S120.

FIG. 7 illustrates an image displayed on the display section 602 of the robot teaching device 600 in step S120 (see the lower right portion of FIG. 1). The robot teaching device 600 displays a user interface UI12 on the display section 602.

The user interface UI12 is a user interface for designating whether or not to prioritize the suppression of vibration in the filtering. The user interface UI12 is specifically a check box with a display of "prioritize suppression of vibration". The robot teaching device 600 receives, as the instruction Ins, designation of whether or not to prioritize the suppression of vibration from the user via the user interface UI12.

Checking the user interface UI12 which is the check box indicates that an instruction to prioritize the suppression of vibration in the filtering is input to the robot teaching device 600. The fact that the user interface UI12 is not checked indicates that an instruction to prioritize the operating speed in the filtering is input to the robot teaching device 600.

That is, the user can input the instruction Ins to prioritize the suppression of vibration by operating the robot teaching device 600 to designate that the suppression of vibration is to be prioritized on the user interface UI12. On the other hand, the user can input the instruction Ins to prioritize the operating speed by operating the robot teaching device 600 to designate that the suppression of vibration is not to be prioritized on the user interface UI12.

In step S140 illustrated in FIG. 6, the cutoff frequency of the low-pass filter 914 is set in accordance with the instruction Ins. Specifically, the VRT filtering section 900 of the robot control device 300 performs the following processing.

In step S120, when the instruction Ins to prioritize the operating speed out of the suppression of vibration of the arm 110 and the operating speed of the arm 110 is received, the cutoff frequency of the low-pass filter 914 is set to a first frequency fc1.

In step S120, when the instruction Ins to prioritize the suppression of vibration out of the suppression of vibration of the arm 110 and the operating speed of the arm 110 is received, the cutoff frequency of the low-pass filter 914 is set to a second frequency fc2 lower than the first frequency fc1.

The processing in step S140 is executed in parallel for the six servo motors 410 disposed in the six joints X11 to X16. FIG. 6 illustrates a plurality of steps S140 in an overlapping manner since the processing in step S140 is executed in parallel for the six servo motors 410.

In the operation of the robot, when the suppression of vibration is prioritized, the operating speed of the robot is reduced. As a result, the cycle time of the work by the robot also becomes longer. On the other hand, when the operating speed of the robot or the cycle time of the work is prioritized, the acceleration and the peak torque of the motors increase in the operation, and thus the vibration is likely to occur. Furthermore, the amplitude of the vibration that has occurred also increases.

In the present embodiment, the user selects fc1 or fc2 as the cutoff frequency of the low-pass filter 914 based on whether or not the user interface UI12, which is the check box, is checked. As a result, it is possible to cause the robot to perform an operation for achieving appropriate position accuracy and processing time according to the work that the robot performs.

In step S140 illustrated in FIG. 6, the VRT filtering sections 900 of the six sets corresponding to the six servo motors 410 set the cutoff frequencies of the low-pass filters 914 of the six sets to values equal to each other according to the instruction Ins input to the robot teaching device 600.

Figure 8:
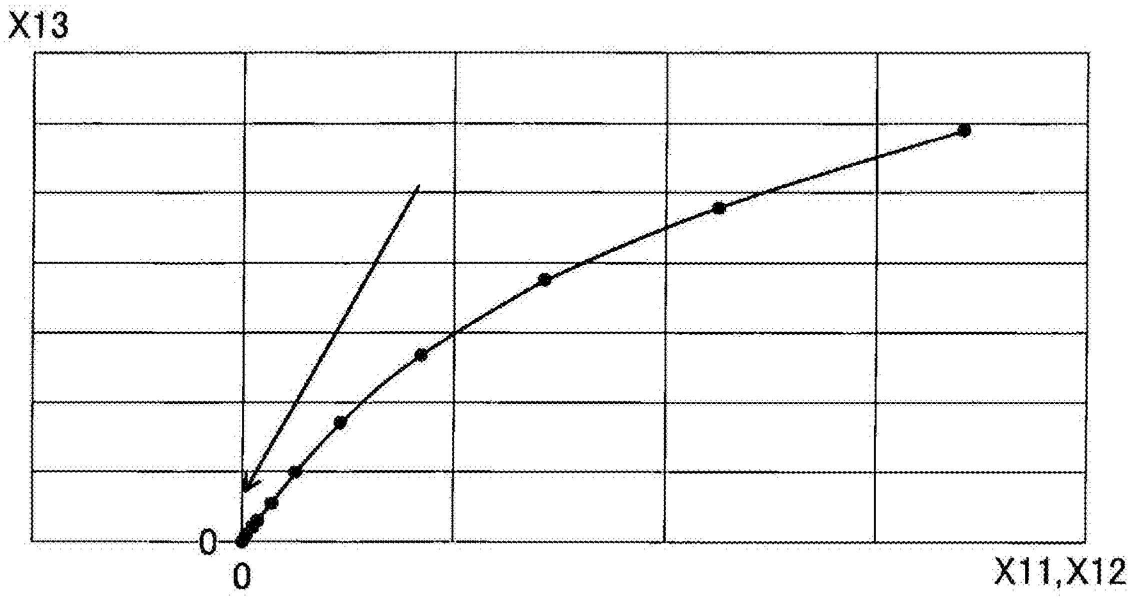
FIG. 8 is a graph illustrating an operation of driving servo motors for joints X11, X12, and X13 in synchronization with each other and positioning an end effector at a destination point.

FIG. 8 is a graph illustrating an operation of driving the servo motors 410 for the joints X11, X12, and X13 in synchronization with each other, moving the end effector 200 in an oblique direction to position the end effector 200 at a destination point. The operation illustrated in FIG. 8 is used, for example, to avoid an obstacle. The horizontal axis in FIG. 8 represents the angular positions of the joints X11 and X12. The vertical axis in FIG. 8 represents the angular position of the joint X13. The angular position (0, 0, 0) of each of the servo motors 410 for the joints X11, X12, and X13 is the destination point.

In the example in FIG. 8, the band-stop filters 912 that reduce a frequency component of the target frequency fe, which is a resonance frequency of the robot 100 in this operation, are applied to position commands for the servo motors 410 that drive the joints X11, X12, and X13 (see the left portion of FIG. 4). Furthermore, the low-pass filters 914 having the same cutoff frequency fc2 are applied to the position commands for the servo motors 410 that drive the joints X11, X12, and X13 (see the right portion of FIG. 4). As illustrated in the lower left portion of FIG. 8, since the servo motors 410 for the joints X11, X12, and X13 are driven and end the operations at the same timing, the joints X11, X12, and X13 are driven until the end of the operations, and the operations end at the destination point.

Figure 9:
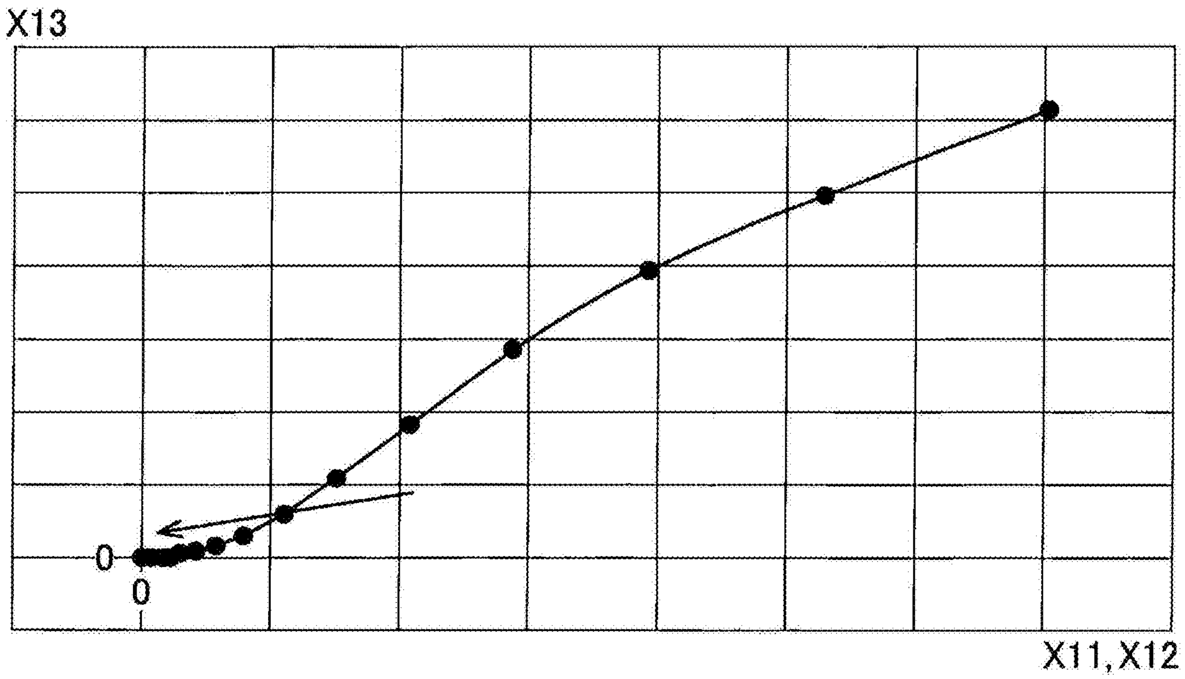
FIG. 9 is a graph illustrating a case where a low-pass filter having a cutoff frequency lower than fc1 is applied only to a position command for the joint X13.

FIG. 9 is a graph illustrating a case where the low-pass filter 914 having a cutoff frequency higher than fc2 is applied only to a position command for the servo motor 410 for driving the joint X13 with respect to the same operation as that in FIG. 8. Other features in the example illustrated in FIG. 9 are the same as those in the example illustrated in FIG. 8. The horizontal axis in FIG. 9 represents the angular positions of the joints X11 and X12. The vertical axis in FIG.

9 represents the angular position of the joint X13. The angular position (0, 0, 0) of each of the servo motors 410 for the joints X11, X12, and X13 is the destination point.

As illustrated in the lower left portion of FIG. 9, the joint X13 reaches the target angular position earlier than the joints X11 and X12. For this reason, the end effector 200 does not operate in an oblique direction in which the angular positions of all the joints are displaced, operates to be displaced only for the joints X11 and X12 indicated by the horizontal axis, and ends the operation. In such a case, for example, since the lowering of the end effector 200 is started too early, the end effector 200 may not be able to sufficiently avoid an obstacle and may come into contact with the obstacle. In addition, since the lowering of the end effector 200 is ended too early, the end effector 200 may be rubbed against the surface of the object to be grasped or the support table 500.

Figure 10:
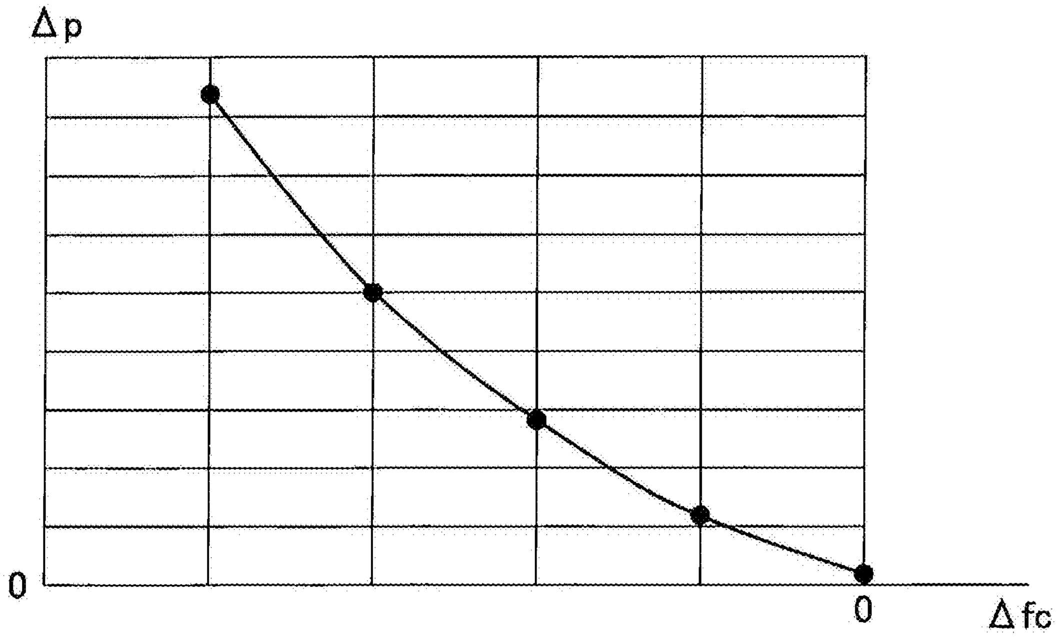
FIG. 10 is a graph illustrating a case where a low-pass filter having a cutoff frequency lower than fc1 is applied only to a position command for the joint X11.

FIG. 10 is a graph illustrating a case where the low-pass filter 914 having a cutoff frequency higher than fc2 is applied only to a position command for the servo motor 410 for driving the joint X11 with respect to the same operation as that in FIG. 8. The low-pass filters 914 having the cutoff frequency fc2 are applied to the position commands for the servo motors 410 that drive the joints X12 and X13. The horizontal axis in FIG. 10 represents the difference Δfc between the cutoff frequency for the joints X12 and X13 and the cutoff frequency for the joint X11. At the right end of FIG. 10, the difference between the cutoff frequency for the joints X12 and X13 and the cutoff frequency for the joint X11 is 0. The cutoff frequency for the joint X11 become higher than the cutoff frequency for the joints X12 and X13 as the value of the above-described difference goes to the left. The vertical axis in FIG. 10 represents the magnitude of a positional deviation Δp at a target point. The positional deviation Δp at the target point is a positional deviation from a target point indicated by the position commands x0 when the filtering is not performed by the VRT filtering sections 900.

As illustrated in FIG. 10, as the difference Δfc between the cutoff frequency for the joints X12 and X13 and the cutoff frequency for the joint X11 increases, the positional deviation Δp at the target point increases (see the upper left portion of FIG. 10).

In step S140 in the present embodiment, the VRT filtering sections 900 of the six sets corresponding to the six servo motors 410 set the cutoff frequencies of the respective low-pass filters 914 of the six sets to values equal to each other according to the instruction input to the robot teaching device 600.

By performing such setting, the position commands x0 for the plurality of servo motors 410 that move the arm 110 are processed in the same manner by the filtering of the VRT filtering sections 900. As a result, it is possible to reduce the possibility that the arm 110 operates while drawing a trajectory different from a trajectory designated in the position commands x0 by some of the servo motors 410 ending the operations first (see FIGS. 8 to 10).

More specifically, in step S140 in FIG. 6, the cutoff frequencies applied to the filtering of the position commands x0 for the six servo motors 410 are set as follows.

The VRT filtering section 900 that processes a position command x0 for a main servo motor 410 that moves the most in the operation to be performed by the arm 110 among the six servo motors 410 sets the cutoff frequency of the low-pass filter 914 according to the instruction Ins input to the robot teaching device 600. The main servo motor 410 that moves the most in the operation to be performed by the arm 110 can be determined based on the position commands x0 for the respective servo motors 410. The operation amount of each of the servo motors 410 in a certain operation is an integrated value of operation pulses given to each of the motors in the operation.

The VRT filtering sections 900 of the servo motors 410 other than the main servo motor 410 among the six servo motors 410 set the cutoff frequencies of the low-pass filters 914 to a value equal to the cutoff frequency of the low-pass filter 914 of the main servo motor 410.

Since such processing is performed, the user can determine, as the operation of the entire arm 110 and with a reasonable processing load, an operation for achieving appropriate position accuracy and processing time according to the work that the robot performs while effectively reducing the vibration of the main servo motor 410 that moves the most in the operation.

The robot teaching device 600 according to the present embodiment is also referred to as an "input section". Each of the VRT filtering sections 900 is also referred to as a "filtering section". Each of the servo motors 410 is also referred to as a "motor". The main servo motor 410 is also referred to as a "main motor". The position controller 320, the speed controller 330, the torque controller 350, and the servo amplifier 360 are also referred to as a "drive signal generator". The robot control device 300 and the robot teaching device 600 are also referred to as a "computer".

Any servo motor 410 which is among the servo motors 410 and is not the main servo motor 410 is also referred to as a "second motor". A drive signal for any servo motor 410 which is among the servo motors 410 and is not the main servo motor 410 is also referred to as a "second drive signal". A position command for any servo motor 410 which is among the servo motors 410 and is not the main servo motor 410 is also referred to as a "second position command". A VRT filtering section 900 that generates a filtered command by filtering a position command for any servo motor 410 which is among the servo motors 410 and is not the main servo motor 410 is also referred to as a "second filtering section". A filtered command xfo generated by filtering a position command for any servo motor 410 which is among the servo motors 410 and is not the main servo motor 410 is also referred to as a "second filtered command". A band-stop filter 912 of a VRT filtering section 900 that generates a filtered command for any servo motor 410 which is among the servo motors 410 and is not the main servo motor 410 is also referred to as a "second band-stop filter". A low-pass filter 914 of a VRT filtering section 900 that generates a filtered command for any servo motor 410 which is among the servo motors 410 and is not the main servo motor 410 is also referred to as a "second low-pass filter". A position controller 320, a speed controller 330, a torque controller 350, and a servo amplifier 360 that generate a drive signal using a filtered command for any servo motor 410 which is among the servo motors 410 and is not the main servo motor 410 are also referred to as a "second drive signal generator".

A2. Modification of First Embodiment

Figure 11:
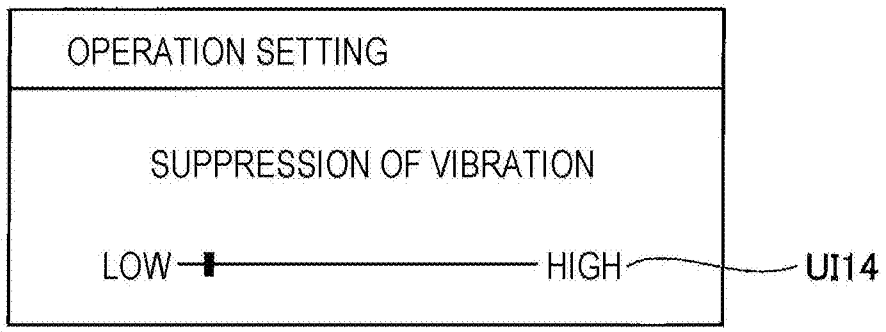
FIG. 11 is a diagram illustrating a modification of a user interface displayed on the display section of the robot teaching device in step S120 illustrated in FIG. 6.

FIG. 11 is a diagram illustrating a modification of the user interface displayed on the display section 602 of the robot teaching device 600 in step S120 in FIG. 6. In the modification of the first embodiment, the robot teaching device 600 displays a user interface UI14 on the display section 602 instead of the user interface UI12 in step S120. The modification of the first embodiment is the same as the first embodiment in other respects.

The user interface UI14 is a user interface for designating a degree to which suppression of vibration is to be prioritized in filtering. Specifically, the user interface UI14 is a slider with a display of "suppression of vibration" at an upper portion and displays of "low" and "high" at both left and right ends.

The arrangement of the user interface UI14, which is the slider, on the right of the center indicates that an instruction to prioritize the suppression of vibration in the filtering is input to the robot teaching device 600. This indicates that as the slider is set to the right in the user interface UI14, an instruction to suppress the vibration more strongly is input to the robot teaching device 600. As a result, the more the slider is set to the right in the user interface UI14, the lower the cutoff frequency fc of each of the low-pass filters 914 is set.

The arrangement of the user interface UI14, which is the slider, on the left of the center indicates that an instruction to prioritize the operating speed in the filtering is input to the robot teaching device 600. This indicates that as the slider is set to the left in the user interface UI14, an instruction to give higher priority to the operating speed is input to the robot teaching device 600. As a result, the more the slider is set to the left in the user interface UI14, the higher the cutoff frequency fc of each of the low-pass filters 914 is set.

In the modification of the first embodiment, a cutoff frequency fcr set when the user interface UI14, which is the slider, is arranged on the right of the center and an instruction to prioritize the suppression of vibration is given is lower than a cutoff frequency fcl set when the slider is arranged on the left of the center and an instruction to prioritize the operating speed is given (fcr<fcl). That is, the user interface UI14 functions as a user interface for designating whether or not to prioritize the suppression of vibration in the filtering.

Even in this aspect, the user operates the robot teaching device 600 to designate that the suppression of vibration is to be prioritized, and thus can input an instruction to prioritize the suppression of vibration. Then, the user operates the robot teaching device 600 to designate that the suppression of vibration is not to be prioritized, and thus can input an instruction to prioritize the operating speed.

In the modification of the first embodiment, the cutoff frequency fcl set when the user interface UI14, which is the slider, is arranged on the left of the center and an instruction to prioritize the operating speed is given is also referred to as a "first frequency". The cutoff frequency fcr set when the user interface UI14, which is the slider, is arranged on the right of the center and an instruction to prioritize the suppression of vibration is given is also referred to as a "second frequency".

B. Second Embodiment

B1. Operation in Second Embodiment

Figure 12:
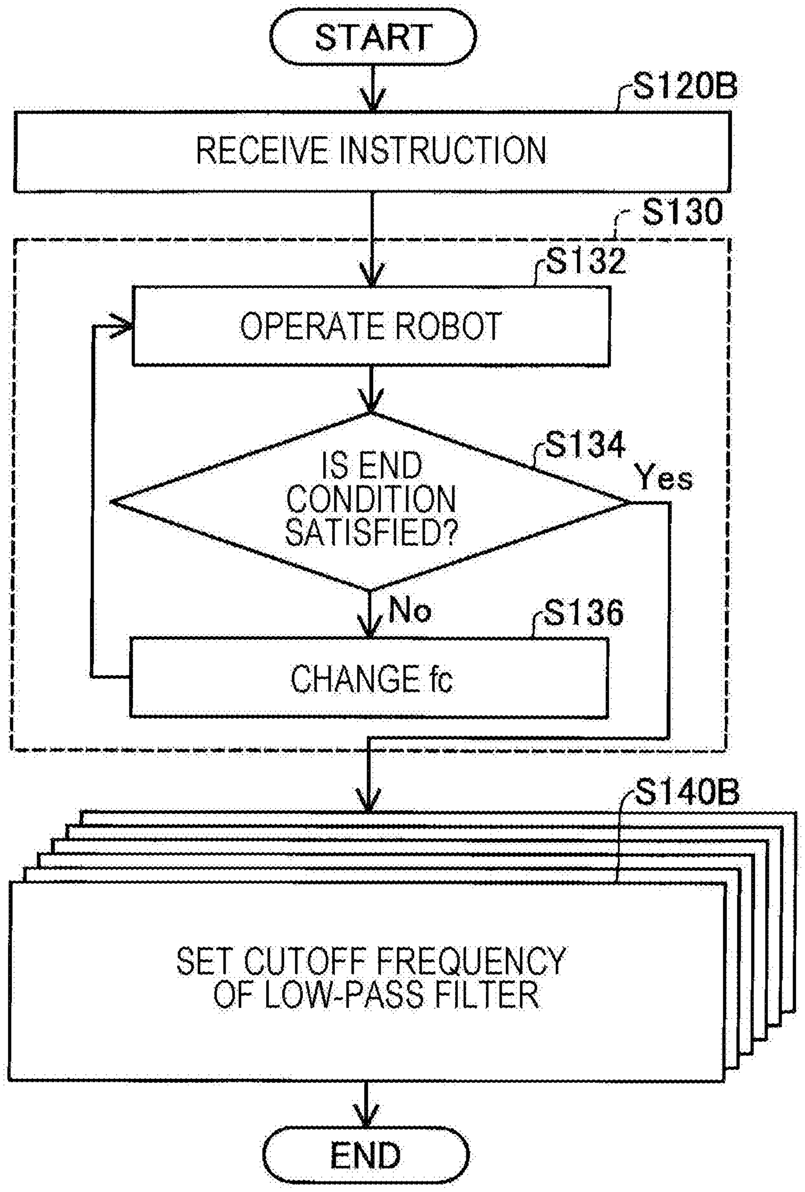
FIG. 12 is a flowchart illustrating a process that is executed in the robot teaching device and the robot control device.

FIG. 12 is a flowchart illustrating a process that is executed in the robot teaching device 600 and the robot control device 300 before the process illustrated in FIG. 5 in the robot 100 and the robot control device 300 (see the lower right portion of FIG. 1). In a second embodiment, steps S120B and S140B are executed instead of steps S120 and S140. Furthermore, the processing in step S130 is executed between step S120B and step S140B. The other features of the robot system 10 according to the second embodiment are the same as those of the robot system 10 according to the first embodiment.

In step S120B, the robot teaching device 600 first performs the same processing as step S120 illustrated in FIG. 7. The robot teaching device 600 receives, via the user interface UI12, designation of whether or not to prioritize the suppression of vibration as an instruction from the user (see FIG. 7).

When the user interface UI12 which is the check box to "prioritize suppression of vibration" is checked and an input of an instruction to prioritize the suppression of vibration is confirmed, the robot teaching device 600 further displays a user interface UI20 on the display section 602.

Figure 13:
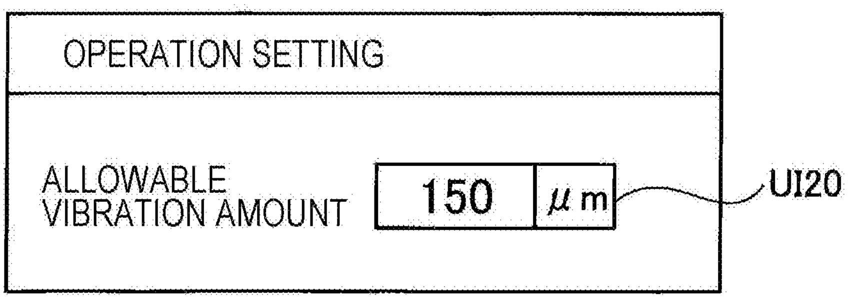
FIG. 13 is a diagram illustrating a user interface displayed on the display section of the robot teaching device in step S120B.

FIG. 13 is a diagram illustrating the user interface UI20 displayed on the display section 602 of the robot teaching device 600 in step S120B (see the lower right portion of FIG. 1). The user interface UI20 is a user interface for designating an allowable vibration amount. The user interface UI20 is specifically an input window with a display of "allowable vibration amount". The robot teaching device 600 receives, via the user interface UI20, designation of the allowable vibration amount as a portion of the instruction Ins to prioritize the suppression of vibration. In the example illustrated in FIG. 13, 150 μm is designated as the allowable vibration amount.

According to this aspect, the user can operate the robot teaching device 600 to designate that the suppression of vibration is to be prioritized, further designate the allowable vibration amount, and determine an operation of the robot 100.

In step S130 illustrated in FIG. 12, the robot teaching device 600 determines the cutoff frequencies fc to be set in the low-pass filters 914. To be specific, the robot teaching device 600 performs processing from step S132 to step S136.

In step S132, the robot teaching device 600 causes the robot control device 300 to perform the process illustrated in FIG. 5 on a trial basis to operate the robot 100. In the processing in the first step S132 in the process illustrated in FIG. 12, the robot teaching device 600 sets a cutoff frequency fc0 set by default as the cutoff frequencies fc of the low-pass filters 914. The robot teaching device 600 measures the amount of vibration at the end of the operation.

In step S134, the robot teaching device 600 determines whether or not an end condition is satisfied. The end condition will be described later. When the end condition is satisfied, the process proceeds to step S140B. When the end condition is not satisfied, the process proceeds to step S136.

In step S136, the robot teaching device 600 changes the cutoff frequencies fc of the low-pass filters 914. When the amount of vibration in the first test operation due to the default cutoff frequency fc0 is less than an allowable vibration amount input in step S120B, the robot teaching device 600 changes the cutoff frequencies fc of the low-pass filters 914 by increasing the cutoff frequencies fc in step S136. When the amount of vibration in the first test operation due to the default cutoff frequency fc0 is greater than the allowable vibration amount input in step S120B, the robot teaching device 600 changes the cutoff frequencies fc of the low-pass filters 914 by reducing the cutoff frequencies fc in step S136. The same applies to the second and subsequent processing in step S136. Thereafter, the process returns to step S132.

FIG. 14 is a table illustrating the processing of changing the cutoff frequencies in step S136 and results of the processing. The first row indicates coefficients by which the default cutoff frequency fc0 is multiplied in the temporary setting of the cutoff frequencies in step S136. The second row indicates cycle times of operations executed as a result.

Each of the cycle times is a time from the start time of the operation to the end time of the operation in the position command x0. The third row indicates overshoot in the executed operations. The overshoot is distances by which a control point overruns the destination point due to vibration during the operations. The overshoot is usually maximum values of the amounts of vibration. The fourth row indicates the peak torque in the executed operations.

As can be seen from FIG. 14, the greater the coefficient by which the default cutoff frequency fc0 is multiplied, that is, the higher the temporarily set cutoff frequency, the shorter the cycle time. As the coefficient by which the cutoff frequency fc0 is multiplied increases, the overshoot increases. As the coefficient by which the cutoff frequency fc0 is multiplied increases, the peak torque increases.

When the amount of vibration in the first test operation due to the default cutoff frequency fc0 is less than the allowable vibration amount, the robot teaching device 600 increases the cutoff frequencies fc of the low-pass filters 914 as follows in step S136. In the first step S136, the robot teaching device 600 sets the cutoff frequencies fc to 1.1 times the default cutoff frequency fc0 (see the upper middle portion of FIG. 14). In the second step S136, the robot teaching device 600 sets the cutoff frequencies fc to 1.2 times the default cutoff frequency fc0. Similarly, in step S136, the coefficient by which the cutoff frequency fc0 is multiplied is increased by 0.1.

In the example illustrated in FIG. 14, the amount of vibration in the first test operation due to the default cutoff frequency fc0 is 60 μm corresponding to a coefficient of 1.0. That is, the amount of vibration is less than the sharable vibration amount of 150 μm input in step S120B (see FIG. 13). For this reason, the robot teaching device 600 increases the cutoff frequencies fc of the low-pass filters 914 by 0.1 in step S136.

When the amount of vibration in the first test operation due to the default cutoff frequency fc0 is greater than the allowable vibration amount, the robot teaching device 600 reduces the cutoff frequencies fc of the low-pass filters 914 in step S136 as follows. In the first step S136, the robot teaching device 600 sets the cutoff frequencies fc to 0.95 times the default cutoff frequency fc0 (see the upper middle portion of FIG. 14). In the second step S136, the robot teaching device 600 sets the cutoff frequencies fc to 0.9 times the default cutoff frequency fc0. Similarly, in step S136, the coefficient by which the cutoff frequency fc0 is multiplied is reduced by 0.05. The value by which the cutoff frequency is reduced is less than the value by which the cutoff frequency is increased.

In step S134 after the processing in steps S136 and S132, the robot teaching device 600 determines whether or not the end condition is satisfied.

When the amount of vibration in the first test operation due to the default cutoff frequency fc0 is less than the allowable vibration amount input in step S120B, the end condition is that the amount of vibration in the test operation executed last in step S132 is greater than the allowable vibration amount input in step S120B or that the cutoff frequencies exceed the first frequency fc1 which is the cutoff frequency when the operating speed is prioritized.

When the end condition is satisfied, the cutoff frequencies fc of the low-pass filters 914 are returned to the cutoff frequency temporarily set immediately before the cutoff frequency temporarily set at that time, and the process proceeds to step S140B.

In the example illustrated in FIG. 14, in the operation when the coefficient is 1.3, the amount of vibration exceeds the allowable vibration amount of 150 μm. Therefore, the robot teaching device 600 returns the cutoff frequencies fc of the low-pass filters 914 to 1.2 times the default cutoff frequency fc0, and the process proceeds to step S140B.

Also in the second embodiment, since such processing is performed, the cutoff frequency set when the user interface UI12, which is the check box, is checked and an instruction to prioritize the suppression of vibration is given is lower than the cutoff frequency fc1 set when an instruction to prioritize the operating speed is given.

When the amount of vibration in the first test operation due to the default cutoff frequency fc0 is greater than the allowable vibration amount input in step S120B, the end condition is that the amount of vibration in the test operation executed last in step S132 is less than the allowable vibration amount input in step S120B. When the end condition is satisfied, the process proceeds to step S140B.

In step S140B, the robot teaching device 600 determines the cutoff frequencies temporarily set at that time as the cutoff frequencies fc to be set in the low-pass filters 914 in the operation of the robot 100.

By performing such processing, it is possible to cause the robot to perform an operation for achieving appropriate position accuracy and processing time according to the work that the robot performs, while reflecting user's intention regarding the amount of vibration. For example, when 100 μm is designated as the allowable vibration amount, frequencies that are 1.1 times the cutoff frequency fc0 set by default are set as the cutoff frequencies (see the lower middle portion of FIG. 14). When 300 μm is designated as the allowable vibration amount, frequencies that are 1.4 times the cutoff frequency fc0 set by default are set as the cutoff frequencies (see the lower middle portion of FIG. 14). When 50 μm is designated as the allowable vibration amount, frequencies that are 0.95 times the cutoff frequency fc0 set by default are set as the cutoff frequencies (see the lower left portion of FIG. 14).

B2. Modifications of Second Embodiment

(1) First Modification of Second Embodiment

The robot system according to the second embodiment may be configured as described below. Differences between the robot system according to the first modification of the second embodiment and the robot system 10 according to the second embodiment will be described below. The other features of the robot system according to the first modification of the second embodiment are the same as those of the robot system according to the second embodiment.

In the first modification of the second embodiment, in step S120B illustrated in FIG. 12, when the user interface UI12 which is the check box to "prioritize suppression of vibration" is not checked and an input of an instruction to prioritize the operating speed is confirmed, the robot teaching device 600 further displays a user interface UI32 on the display section 602.

Figure 15:
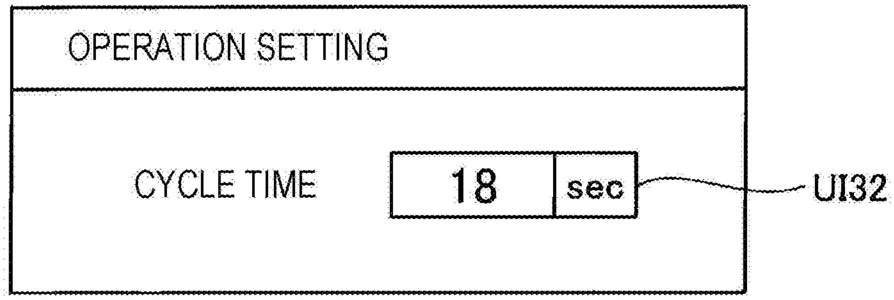
FIG. 15 is a diagram illustrating a user interface displayed on the display section of the robot teaching device in step S120B illustrated in FIG. 12.

FIG. 15 is a diagram illustrating the user interface UI32 displayed on the display section 602 of the robot teaching device 600 in step S120B illustrated in FIG. 12 (see the lower right portion of FIG. 1). The user interface UI32 is a user interface for designating an allowable cycle time. The user interface UI32 is specifically an input window with a display of "cycle time". The robot teaching device 600 receives designation of the allowable cycle time via the user interface UI32 as a portion of the instruction to prioritize the operating speed. In the example illustrated in FIG. 15, 18 seconds is designated as the allowable cycle time.

In step S132 illustrated in FIG. 12, the robot teaching device 600 causes the robot control device 300 to perform the process illustrated in FIG. 5 on a trial basis to operate the robot 100. In the processing in the first step S132 in the process illustrated in FIG. 12, the robot teaching device 600 sets the default cutoff frequency fc0 as the cutoff frequencies fc of the low-pass filters 914. The robot teaching device 600 measures the cycle time of the operation.

In step S134, the robot teaching device 600 determines whether or not an end condition is satisfied. The end condition will be described later. When the end condition is satisfied, the process proceeds to step S140B. When the end condition is not satisfied, the process proceeds to step S136.

In step S136, the robot teaching device 600 changes the cutoff frequencies fc of the low-pass filters 914. When the cycle time of the first test operation due to the default cutoff frequency fc0 is longer than the allowable cycle time input in step S120B, the robot teaching device 600 changes the cutoff frequencies fc of the low-pass filters 914 by increasing the cutoff frequencies in step S136. When the cycle time of the first test operation due to the default cutoff frequency fc0 is shorter than the allowable cycle time input in step S120B, the robot teaching device 600 changes the cutoff frequencies fc of the low-pass filters 914 by reducing the cutoff frequencies in step S136. The same applies to the second and subsequent processing in step S136. Thereafter, the process returns to step S132.

In the first modification of the second embodiment, the method of increasing the cutoff frequencies and the method of reducing the cutoff frequencies in step S136 are the same as those in the second embodiment.

In step S134 after the processing steps S136 and S132, the robot teaching device 600 determines whether or not the end condition is satisfied.

When the cycle time of the first test operation due to the default cutoff frequency fc0 is longer than the allowable cycle time input in step S120B, the end condition is that the cycle time of the test operation executed last in step S132 is shorter than the allowable cycle time input in step S120B. When the end condition is satisfied, the process proceeds to step S140B.

When the cycle time of the first test operation due to the default cutoff frequency fc0 is shorter than the allowable cycle time input in step S120B, the end condition is as follows. That is, the end condition is that the cycle time of the test operation executed last in step S132 exceeds the allowable cycle time input in step S120B, or that the cutoff frequencies fall below the second frequency fc2, which is the cutoff frequency when the suppression of vibration is prioritized. When the end condition is satisfied, the cutoff frequencies fc of the low-pass filters 914 are returned to the cutoff frequencies temporarily set immediately before the cutoff frequencies temporarily set at that time, and the process proceeds to step S140B.

In step S140B, the robot teaching device 600 determines the cutoff frequencies temporarily set at that time as the cutoff frequencies fc to be set in the low-pass filters 914 in the operation of the robot 100.

In the first modification of the second embodiment, since such processing is performed, the cutoff frequencies set when the user interface UI12, which is the check box, is not checked and an instruction to prioritize the operating speed is given are higher than the cutoff frequency fc2 set when an instruction to prioritize the suppression of vibration is given.

In the first modification of the second embodiment, due to the process illustrated in FIG. 15, the user can determine an operation of the robot by operating the robot teaching device 600 to designate the cycle time of the work that the robot system 10 performs. In addition, due to the processing in step S130, it is possible to cause the robot to perform an operation for achieving appropriate position accuracy and processing time according to the work that the robot performs, while reflecting user's intention regarding the cycle time.

(2) Second Modification of Second Embodiment

The robot system according to the second embodiment may be configured as described below. Differences between the robot system according to a second modification of the second embodiment and the robot system according to the first modification of the second embodiment will be described below. The other features of the robot system according to the second modification of the second embodiment are the same as those of the robot system according to the first modification of the second embodiment.

In the second modification of the second embodiment, in step S120B illustrated in FIG. 12, when the user interface UI12 which is the check box to "prioritize suppression of vibration" is not checked and an input of an instruction to prioritize the operating speed is confirmed, the robot teaching device 600 further displays a user interface UI34 on the display section 602.

Figure 16:
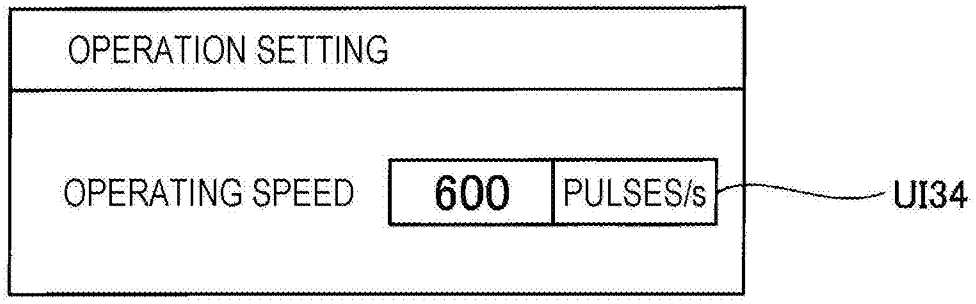
FIG. 16 is a diagram illustrating a user interface displayed on the display section of the robot teaching device in step S120B illustrated in FIG. 12.

FIG. 16 is a diagram illustrating the user interface UI34 displayed on the display section 602 of the robot teaching device 600 in step S120B illustrated in FIG. 12 (see the lower right portion of FIG. 1). The user interface UI34 is a user interface for designating a maximum value of an allowable operating speed. The user interface UI34 is specifically an input window with a display of "operating speed". The robot teaching device 600 receives designation of the allowable operating speed via the user interface UI34 as a portion of the instruction to prioritize the operating speed. In the example illustrated in FIG. 15, 600 pulses/second is designated as the maximum value of the allowable operating speed.

In step S132 illustrated in FIG. 12, the robot teaching device 600 causes the robot control device 300 to perform the process illustrated in FIG. 5 on a trial basis to operate the robot 100. The robot teaching device 600 measures the maximum value of the operating speed in the operation. In other respects, the processing in step S132 in the second modification of the second embodiment is the same as the processing in step S132 in the first modification of the second embodiment.

In step S134, the robot teaching device 600 determines whether or not an end condition is satisfied. The end condition will be described later. When the end condition is satisfied, the process proceeds to step S140B. When the end condition is not satisfied, the process proceeds to step S136.

In step S136, the robot teaching device 600 changes the cutoff frequencies fc of the low-pass filters 914. When the maximum value of the operating speed in the first test operation due to the default cutoff frequency fc0 is greater than the maximum value of the allowable operating speed input in step S120B, the robot teaching device 600 changes the cutoff frequency fc of the low-pass filter 914 by increasing the cutoff frequency fc in step S136. When the maximum value of the operating speed of the first test operation due to the default cutoff frequency fc0 is less than the maximum value of the allowable operating speed input in step S120B, the robot teaching device 600 changes the cutoff frequency fc of the low-pass filter 914 by reducing the cutoff frequency fc in step S136. The same applies to the second and subsequent processing in step S136. Thereafter, the process returns to step S132.

In the second modification of the second embodiment, the method of increasing the cutoff frequencies and the method of reducing the cutoff frequencies in step S136 are the same as those in the second embodiment.

In step S134 after the processing in steps S136 and S132, the robot teaching device 600 determines whether or not the end condition is satisfied.

When the maximum value of the operating speed in the first test operation due to the default cutoff frequency fc0 is greater than the maximum value of the allowable operating speed input in step S120B, the end condition is that the maximum value of the operating speed in the test operation executed last in step S132 is less than the maximum value of the allowable operating speed input in step S120B. When the end condition is satisfied, the process proceeds to step S140B.

When the maximum value of the operating speed in the first test operation due to the default cutoff frequency fc0 is less than the maximum value of the allowable operating speed input in step S120B, the end condition is as follows. That is, the end condition is that the maximum value of the operating speed in the test operation executed last in step S132 exceeds the maximum value of the allowable operating speed input in step S120B, or that the cutoff frequencies fall below the second frequency fc2 which is the cutoff frequency when the suppression of vibration is prioritized. When the end condition is satisfied, the cutoff frequencies fc of the low-pass filters 914 are returned to the cutoff frequencies temporarily set immediately before the cutoff frequencies temporarily set at that time, and the process proceeds to step S140B.

In step S140B, the robot teaching device 600 determines the cutoff frequencies temporarily set at that time as cutoff frequencies fc to be set in the low-pass filters 914 in the operation of the robot 100.

In the second modification of the second embodiment, due to the process illustrated in FIG. 16, the user can determine an operation of the robot by operating the robot teaching device 600 to designate the operating speeds of the servo motors 410. Then, due to the processing in step S130, it is possible to cause the robot to perform an operation for achieving appropriate position accuracy and processing time according to the work that the robot performs, while reflecting user's intention regarding the operating speeds of the servo motors 410.

C. Other Embodiments

C1. Alternative Embodiment 1

(1) In the first embodiment, the arm 110 of the robot 100 is driven by rotating each of the six joints X11 to X16 by the servo motors 410 (see FIGS. 1 to 3). However, the arm of the robot may be driven by rotating one joint by one servo motor. Furthermore, the number of joints and the number of servo motors may be two to five, or may be seven or more.

(2) In the first embodiment, the VRT filtering section 900 generates a filtered command xfo by filtering a position command x0 generated by the command generator 310 during the execution of an operation by the robot 100 (see the middle left portion of FIG. 3 and FIG. 5). The filtering in the filtering section may be performed on a position command generated by the command generator, or may be performed on a command generated by performing some processing on the position command generated by the command generator. In the present specification, such an aspect is also included in "filtering a position command to generate a filtered command".

(3) In the first embodiment, in step S242, first, the band-stop filter 912 is applied to the position command x0. Thereafter, in step S244, the low-pass filter 914 is applied to the position command to which the band-stop filter 912 has been applied (see FIGS. 4 and 5). However, the low-pass filter may be applied to the position command first, and then the band-stop filter may be applied to the position command.

(4) In the first embodiment, the VRT filtering section 900 includes the band-stop filter 912 and the low-pass filter 914. However, the filtering section may include a plurality of band-stop filters. One or more band-stop filters may include a notch filter in which the range of a frequency component to be reduced is narrower than that of the one or more band-stop filters in a narrow sense. In this specification, the term "band-stop filter" is used to include a so-called notch filter. The filtering section may include a plurality of low-pass filters. The order in which the filters are applied to position commands can be any order.

(5) In the first modification of the second embodiment, the robot teaching device 600 displays the user interface UI32 and receives the input of the allowable cycle time (see FIG. 15). In the second modification of the second embodiment, the robot teaching device 600 displays the user interface UI34 and receives the input of the maximum value of the allowable operating speed (see FIG. 16). However, the robot teaching device 600 can display both the user interfaces UI32 and UI34 and receive the input of at least one of the allowable cycle time and the allowable maximum value of the operating speed.

(6) In the second embodiment, when the amount of vibration in the first test operation due to the default cutoff frequency fc0 is less than the allowable vibration amount input in step S120B, the robot teaching device 600 changes the cutoff frequencies fc of the low-pass filters 914 by increasing the cutoff frequencies fc in step S136 (see FIG. 12). When the amount of vibration in the first test operation due to the default cutoff frequency fc0 is greater than the allowable vibration amount input in step S120B, the robot teaching device 600 changes the cutoff frequencies fc of the low-pass filters 914 by reducing the cutoff frequencies fc in step S136.

When the amount of vibration in the first test operation due to the default cutoff frequency fc0 is equal to the allowable vibration amount input in step S120B, the robot teaching device 600 may increase or reduce the cutoff frequencies fc of the low-pass filters 914 in step S136. However, it is preferable that the cutoff frequencies fc of the low-pass filters 914 are consistently increased or reduced in step S136 repeatedly executed. The same applies to the modifications of the second embodiment. In addition, a value by which the cutoff frequencies fc are deceased may be equal to a value by which the cutoff frequencies fc are increased, or may be greater than the value by which the cutoff frequencies fc are increased.

(7) In the second embodiment, the robot teaching device 600 displays the user interface UI20 and receives the input of the allowable vibration amount (see FIG. 13). In the first modification of the second embodiment, the robot teaching device 600 displays the user interface UI32 and receives the input of the allowable cycle time (see FIG. 15). In the second modification of the second embodiment, the robot teaching device 600 displays the user interface UI34 and receives the input of the maximum value of the allowable operating speed (see FIG. 16). However, the robot teaching device 600 may instead display a user interface for receiving an input of allowable peak torque and receive the input of the allowable peak torque (see the lower portion of FIG. 14).

(8) In the second embodiment, the user interface UI20 is a user interface for designating an allowable vibration amount. The user interface UI20 is specifically the input window with the display of "allowable vibration amount" (see FIG. 13). In the first modification of the second embodiment, the user interface UI32 is a user interface for designating an allowable cycle time. The user interface UI32 is specifically the input window with the display of "cycle time" (see FIG. 15). In the second modification of the second embodiment, the user interface UI34 is a user interface for designating the maximum value of the allowable operating speed. The user interface UI34 is specifically the input window with the display of "operating speed" (see FIG. 16).

However, instead of these input windows, a slider for designating the allowable vibration amount, the allowable cycle time, or the allowable operating speed may be displayed as a user interface.

(9) In the first embodiment, the VRT filtering section 900 includes a set of the band-stop filter 912 and the low-pass filter 914 (see FIG. 4). However, the filtering section may include a plurality of sets of band-stop filters and low-pass filters, and these sets may be switched and used.

In such an aspect, the filtering section may include a first filter section, a second filter section, a switching section, and a synthesizing section. The first filter section generates a first command by performing processing of reducing a first target frequency component on a signal based on a position command. The second filter section generates a second command by performing processing of reducing a second target frequency component on a signal based on a position command. The switching section selectively inputs a position command generated by the command generator to the first filter section and the second filter section. The synthesizing section generates a filtered command using a sum of a signal based on the first command and a signal based on the second command.

In this aspect, while the filtered command is generated using the sum of the signal based on the first command and the signal based on the second command, the position command generated by the command generator is selectively input to the first filter section and the second filter section, and thus it is possible to rapidly switch the frequency of vibration to be reduced.

In the robot according to the embodiment, the switching section may selectively execute the following processing according to an input of an instruction to switch the filtering, thereby selectively inputting the position command generated by the command generator. (i) Processing of inputting 0 as the position command to the second filter section and inputting the position command generated by the command generator to the first filter section. (ii) Processing of inputting 0 as the position command to the first filter section and inputting the position command generated by the command generator to the second filter section.

According to this aspect, it is possible to easily switch the filtering by switching the input of the position command to each of the first filter section and the second filter section.

C2. Alternative Embodiment 2

In the first embodiment, the robot teaching device 600 displays the user interface UI12 on the display section 602 (see S120 in FIGS. 7 and 6). The user interface UI12 is a user interface for designating whether or not to prioritize the suppression of vibration in the filtering. In the modification of the first embodiment, the robot teaching device 600 displays the user interface UI14 on the display section 602 (see FIGS. 11 and S120 in FIG. 6). The user interface UI14 functions as a user interface for designating whether or not to prioritize the suppression of vibration in the filtering.

However, in the technique of the present disclosure, it is also possible to adopt a mode in which the user interface for designating whether or not to prioritize the suppression of vibration in the filtering is not displayed. For example, one or more of the user interfaces UI20, UI32, and UI34 may be displayed without displaying the user interface UI12 and the user interface UI14, and the input of one or more of the allowable vibration amount, the allowable cycle time, and the maximum value of the allowable operating speed may be received (see FIGS. 13, 15, and 16). In such an aspect, the cutoff frequencies fc of the low-pass filters 914 can be set according to the allowable vibration amount, the allowable cycle time, or the maximum value of the allowable operating speed without being limited to the first frequency fc1 or the second frequency fc2. In such an aspect, as a result, whether or not to prioritize the suppression of vibration is designated by using an input numerical value.

C3. Alternative Embodiment 3

In the second embodiment, when the user interface UI12 which is the check box to "prioritize suppression of vibration" is checked, the robot teaching device 600 further displays the user interface UI20 on the display section 602 (see FIG. 13). The user interface UI20 is a user interface for designating an allowable vibration amount. However, in the technique of the present disclosure, as described in the first embodiment, the modification of the first embodiment, and the modifications of the second embodiment, the user interface for designating an allowable vibration amount may not be displayed (see FIGS. 15 and 16).

C4. Alternative Embodiment 4

In the first modification of the second embodiment, when the user interface UI12 which is the check box to "prioritize suppression of vibration" is not checked in step S120B illustrated in FIG. 12, the robot teaching device 600 displays the user interface UI32 on the display section 602 (see FIG. 15). The user interface UI32 is a user interface for designating an allowable cycle time.

In the second modification of the second embodiment, when the user interface UI12 which is the check box to "prioritize suppression of vibration" is not checked in step S120B illustrated in FIG. 12, the robot teaching device 600 displays the user interface UI34 on the display section 602 (see FIG. 16). The user interface UI34 is a user interface for designating the maximum value of the allowable operating speed.

However, in the technique of the present disclosure, as described in the first embodiment, the modification of the first embodiment, and the second embodiment, the user interface for designating the operating speeds of the motors or the cycle time of the work that the robot system performs may not be displayed (see FIG. 13).

C5. Alternative Embodiment 5

In the first embodiment, the VRT filtering sections 900 of the six sets corresponding to the six servo motors 410 set the cutoff frequencies of the respective low-pass filters 914 of the six sets to values equal to each other according to the instruction Ins input to the robot teaching device 600 (see S140 in FIG. 6). However, the plurality of filtering sections corresponding to the plurality of servo motors may independently set the cutoff frequencies of the respective low-pass filters according to the instruction input to the input section. In such an aspect, the cutoff frequencies of the low-pass filters can be set by reflecting the characteristics of each of the joints and arm portions coupled to the joints.

C6. Alternative Embodiment 6

In the first embodiment, the VRT filtering section 900 that processes the position command x0 for the main servo motor 410 that moves the most in the operation to be performed by the arm 110 among the six servo motors 410 sets the cutoff frequency of the low-pass filter 914 according to the instruction Ins input to the robot teaching device 600. The VRT filtering sections 900 of the other servo motors 410 set the cutoff frequencies of the low-pass filters 914 to a value equal to the cutoff frequency of the low-pass filter 914 of the main servo motor 410. However, the cutoff frequency of the low-pass filter 914 of each of the servo motors 410 may be determined by another method.

For example, when the robot is caused to perform an operation in which the control point draws a straight line, the motor that is the closest to a base on which the robot is installed among the plurality of motors for driving the arm can be set as the main motor regardless of the operation amount of each of the motors. When the robot is caused to perform an operation in which the control point draws an arc, one or more motors including a motor that is the closest to the end effector among the plurality of motors for driving the arm can be set as the main motor regardless of the operation amount of each of the motors.

C7. Alternative Embodiment 7

In the above-described embodiments, the cutoff frequencies fL and fH of the band-stop filter 912 are not changed according to the instruction Ins input to the robot teaching device 600 (see the left portion of FIG. 3). However, the cutoff frequencies fL and fH of the band-stop filter 912 may be changed according to the instruction Ins input to the robot teaching device 600. Furthermore, the cutoff frequencies fL and fH of the band-stop filter 912 may be changed according to another instruction.

D. Other Embodiments

The present disclosure is not limited to the above-described embodiments, and can be implemented in various aspects without departing from the gist of the present disclosure. For example, the present disclosure can also be implemented in the following aspects. Technical features in the embodiments corresponding to technical features in the aspects described below can be appropriately replaced or combined in order to solve some or all of the problems described in the present disclosure, or in order to achieve some or all of the effects of the present disclosure. Furthermore, when a technical feature is not described as an essential feature in the present specification, the technical feature can be appropriately removed.

(1) According to an aspect of the present disclosure, a robot system is provided. The robot system includes an arm, a motor that moves the arm according to a drive signal, a controller that controls the motor, and an input section that receives an instruction from an outside. The controller includes a filtering section that filters a position command to generate a filtered command, and a drive signal generator that generates the drive signal using the filtered command. The filtering section includes a band-stop filter that is used for the filtering and a low-pass filter that is used for the filtering and has a variable cutoff frequency. The cutoff frequency is set to a first frequency when the input section receives an instruction to prioritize an operating speed out of suppression of vibration of the arm and the operating speed of the arm, and the cutoff frequency is set to a second frequency lower than the first frequency when the input section receives an instruction to prioritize the suppression of vibration out of the suppression of vibration of the arm and the operating speed of the arm.

According to this aspect, the user adjusts the cutoff frequency of the low-pass filter, and thus it is possible to cause the robot to perform an operation for achieving appropriate position accuracy and processing time according to work that the robot performs, while reflecting user's intention.

(2) In the robot system according to the aspect, it is possible to adopt an aspect in which the input section includes a display section capable of displaying information, and is capable of displaying, on the display section, a user interface for designating whether or not to prioritize the suppression of vibration in the filtering, and capable of receiving, via the user interface, designation of whether or not to prioritize the suppression of vibration as at least a portion of the instruction.

According to this aspect, the user can input the instruction to prioritize the suppression of vibration by operating the input section to designate that the suppression of vibration is to be prioritized, and can input the instruction to prioritize the operating speed by operating the input section to designate that the suppression of vibration is not to be prioritized.

(3) In the robot system according to the aspect, it is possible to adopt an aspect in which the input section is capable of displaying, on the display section, a user interface for designating an allowable vibration amount, and capable of receiving, via the user interface, designation of the allowable vibration amount as at least a portion of the instruction to prioritize the suppression of vibration.

According to this aspect, the user can determine an operation of the robot by operating the input section to designate that the suppression of vibration is to be prioritized and designate the allowable vibration amount.

(4) In the robot system according to the aspect, it is possible to adopt an aspect in which the input section includes a display section capable of displaying information, and is capable of displaying, on the display section, a user interface for designating at least one of an operating speed of the motor and a cycle time of work that the robot system performs, and capable of receiving, via the user interface, at least one of designation of the operating speed of the motor and designation of the cycle time of the work that the robot system performs as at least a portion of the instruction to prioritize the operating speed.

According to this aspect, the user can determine an operation of the robot by operating the input section to designate at least one of the operating speed of the motor and the cycle time of the work that the robot system performs.

(5) In the robot system according to the aspect, it is possible to adopt an aspect in which the controller further includes a second motor that moves the arm according to a second drive signal, the controller further controls the second motor, the controller further includes a second filtering section that filters a second position command to generate a second filtered command, and a second drive signal generator that generates the second drive signal using the second filtered command, the second filtering section includes a second band-stop filter that is used for the filtering by the second filtering section and a second low-pass filter that is used for the filtering by the second filtering section and has a variable cutoff frequency, and the second filtering section sets the cutoff frequency of the second low-pass filter to a value equal to the cutoff frequency of the low-pass filter according to the instruction input to the input section.

According to this aspect, the position command for the motor that moves the arm and the second position command for the second motor are processed by the filtering of the filtering section and by the filtering of the second filtering section in the same manner, respectively. As a result, the possibility that the arm operates while drawing a trajectory different from a trajectory designated in the position command can be reduced by causing one of the motor and the second motor end the operation first.

(6) In the robot system according to the aspect, it is possible to adopt an aspect in which the motor is a main motor that moves the most in an operation to be performed by the arm, the filtering section sets the cutoff frequency of the low-pass filter according to the instruction input to the input section, and the second filtering section sets the cutoff frequency of the second low-pass filter to a value equal to the cutoff frequency of the low-pass filter.

According to this aspect, the user can determine, as the operation of the entire arm, an operation for achieving appropriate position accuracy and processing time according to the work that the robot performs.

(7) In the robot system of the aspect, it is possible to adopt an aspect in which the filtering section does not change a cutoff frequency of the band-stop filter according to the instruction input to the input section.

According to this aspect, it is possible to generate a drive signal for the robot while reflecting user' intention in the setting of the cutoff frequency of the low-pass filter. On the other hand, by setting the cutoff frequency of the band-stop filter to a resonance frequency of the robot, it is possible to generate a drive signal that does not cause the robot to greatly resonate, without depending on the instruction of the user.

(8) According to another aspect of the present disclosure, a method for controlling a robot including an arm and a motor that moves the arm according to a drive signal is provided. The method includes performing, on the motor, a drive signal generation process including filtering a position command to generate a filtered command and generating the drive signal using the filtered command. The filtering the position command to generate the filtered command includes applying a band-stop filter and a low-pass filter having a variable cutoff frequency to the position command. The method further includes receiving an instruction from an outside, and setting the cutoff frequency of the low-pass filter according to the instruction before the application of the low-pass filter to the position command. The setting the cutoff frequency of the low-pass filter is to set the cutoff frequency to a first frequency when an instruction to prioritize an operating speed out of suppression of vibration of the arm and the operating speed of the arm is received, and set the cutoff frequency to a second frequency lower than the first frequency when an instruction to prioritize the suppression of vibration out of the suppression of vibration of the arm and the operating speed of the arm is received.

According to this aspect, the user can generate a drive signal for achieving appropriate position accuracy and processing time according to the work that the robot performs as the operation of the robot.

(9) In the method for controlling the robot according to the aspect, it is possible to adopt an aspect in which the receiving the instruction from the outside includes displaying, on a display section, a user interface for designating whether or not to prioritize the suppression of vibration in the filtering, and receiving, via the user interface, designation of whether or not to prioritize the suppression of vibration as at least a portion of the instruction.

According to this aspect, the user can input the instruction to prioritize the suppression of vibration by designating that the suppression of vibration is to be prioritized, and can input the instruction to prioritize the operating speed by designating that the suppression of vibration is not to be prioritized.

(10) In the method for controlling the robot according to the aspect, it is possible to adopt an aspect in which the receiving the instruction from the outside includes displaying, on the display section, a user interface for designating an allowable vibration amount, and receiving, via the user interface, designation of the allowable vibration amount as at least a portion of the instruction to prioritize the suppression of vibration.

According to this aspect, the user can determine an operation of the robot by operating the input section to designate that the suppression of vibration is to be prioritized and designate the allowable vibration amount.

(11) In the method for controlling the robot according to the aspect, it is possible to adopt an aspect in which the receiving the instruction from the outside includes displaying, on a display section, a user interface for designating at least one of an operating speed of the motor and a cycle time of work that the robot performs; and receiving, via the user interface, at least one of designation of the operating speed of the motor and designation of the cycle time of the work that the robot performs as at least a portion of the instruction to prioritize the operating speed.

According to this aspect, the user can determine an operation of the robot by designating at least one of the operating speed of the motor and the cycle time of the work that the robot performs.

(12) In the method for controlling the robot according to the aspect, it is possible to adopt an aspect in which the robot includes a second motor that moves the arm according to a second drive signal, and the method includes performing, on the second motor, a second drive signal generation process including filtering a second position command to generate a second filtered command and generating the second drive signal using the second filtered command, the generating the second filtered command includes applying a second band-stop filter and a second low-pass filter having a variable cutoff frequency to the second position command, the method further includes setting the cutoff frequency of the second low-pass filter according to the instruction before the application of the second low-pass filter to the second position command, and the setting the cutoff frequency of the second low-pass filter includes setting the cutoff frequency of the second low-pass filter to a value equal to the cutoff frequency of the low-pass filter.

According to this aspect, the position command for the motor that moves the arm and the second position command for the second motor are processed by the filtering in the same manner. As a result, the possibility that the arm operates while drawing a trajectory different from a trajectory designated in the position command can be reduced by causing one of the motor and the second motor to end the operation first.

(13) In the method for controlling the robot according to the aspect, it is possible to adopt an aspect in which the motor is a main motor that moves the most in an operation to be performed by the arm, the cutoff frequency of the low-pass filter is set according to the instruction in the setting of the cutoff frequency of the low-pass filter to be applied to the position command, and the cutoff frequency of the second low-pass filter is set to a value equal to the cutoff frequency of the first low-pass filter in the setting of the cutoff frequency of the second low-pass filter.

According to this aspect, the user can generate a drive signal for achieving appropriate position accuracy and processing time according to the work that the robot performs, as the operation of the entire arm.

(14) In the method for controlling the robot according to the aspect, it is possible to adopt an aspect in which a cutoff frequency of the band-stop filter is not changed according to the instruction.

According to this aspect, it is possible to generate a drive signal for the robot while reflecting user's intention in the setting of the cutoff frequency of the low-pass filter. On the other hand, by setting the cutoff frequency of the band-stop filter to a resonance frequency of the robot, it is possible to generate a drive signal that does not cause the robot to greatly resonate, without depending on the instruction of the user.

(15) According to still another aspect of the present disclosure, a non-transitory computer-readable storage medium storing a computer program for controlling, using a computer, a robot including an arm and a motor that moves the arm according to a drive signal is provided. The computer program causes the computer to implement a function of executing, on the motor, a function of filtering a position command to generate a filtered command, and a function of generating the drive signal using the filtered command. The function of filtering the position command to generate the filtered command includes a function of applying a band-stop filter and a low-pass filter having a variable cutoff frequency to the position command, a function of receiving an instruction from an outside, and a function of setting the cutoff frequency of the low-pass filter according to the instruction before the application of the low-pass filter to the position command. The function of setting the cutoff frequency of the low-pass filter includes a function of setting the cutoff frequency to a first frequency when an instruction to prioritize an operating speed out of suppression of vibration of the arm and the operating speed of the arm is received, and setting the cutoff frequency to a second frequency lower than the first frequency when an instruction to prioritize the suppression of vibration out of the suppression of vibration of the arm and the operating speed of the arm is received.

The present disclosure can also be implemented in various forms other than the robot, the method for controlling the robot, and the program for controlling the robot. For example, the present disclosure can be implemented in forms of a device for setting the robot, a method for setting the robot, a computer program for implementing the method, a non-transitory recording medium storing the computer program, and the like.

The invention claimed is:

1. A robot system comprising:

an arm;

a motor that moves the arm according to a drive signal;

a controller that controls the motor; and an input section that receives an instruction from an outside, wherein the controller includes a filtering section that filters a position command to generate a filtered command, and a drive signal generator that generates the drive signal using the filtered command, the filtering section includes a band-stop filter that is used for the filtering, and a low-pass filter that is used for the filtering and has a variable cutoff frequency, the cutoff frequency is set to a first frequency when the input section receives an instruction to prioritize an operating speed out of suppression of vibration of the arm and the operating speed of the arm, and the cutoff frequency is set to a second frequency lower than the first frequency when the input section receives an instruction to prioritize the suppression of vibration out of the suppression of vibration of the arm and the operating speed of the arm.

2. The robot system according to claim 1, wherein the input section includes a display section capable of displaying information, the input section is capable of displaying, on the display section, a user interface for designating whether or not to prioritize the suppression of vibration in the filtering, and the input section is capable of receiving, via the user interface, designation of whether or not to prioritize the suppression of vibration as at least a portion of the instruction.

3. The robot system according to claim 2, wherein the input section is capable of displaying, on the display section, a user interface for designating an allowable vibration amount, and receiving, via the user interface, designation of the allowable vibration amount as at least a portion of the instruction to prioritize the suppression of vibration.

4. The robot system according to claim 1, wherein the input section includes a display section capable of displaying information, the input section is capable of displaying, on the display section, a user interface for designating at least one of an operating speed of the motor and a cycle time of work that the robot system performs, and receiving, via the user interface, at least one of designation of the operating speed of the motor and designation of the cycle time of the work that the robot system performs as at least a portion of the instruction to prioritize the operating speed.

5. The robot system according to claim 1, further comprising:

a second motor that moves the arm according to a second drive signal, wherein the controller further controls the second motor, the controller further includes a second filtering section that filters a second position command to generate a second filtered command, and a second drive signal generator that generates the second drive signal using the second filtered command, the second filtering section includes
a second band-stop filter that is used for the filtering by the second filtering section, and
a second low-pass filter that is used for the filtering by the second filtering section and has a variable cutoff frequency, and
the second filtering section sets the cutoff frequency of the second low-pass filter to a value equal to the cutoff frequency of the low-pass filter according to the instruction input to the input section.

6. The robot system according to claim 5, wherein
the motor is a main motor that moves the most in an operation to be performed by the arm,
the filtering section sets the cutoff frequency of the low-pass filter according to the instruction input to the input section, and
the second filtering section sets the cutoff frequency of the second low-pass filter to a value equal to the cutoff frequency of the low-pass filter.

7. The robot system according to claim 1, wherein
the filtering section does not change a cutoff frequency of the band-stop filter according to the instruction input to the input section.

8. A method for controlling a robot including an arm and a motor that moves the arm according to a drive signal, the method comprising:
performing, on the motor, a drive signal generation process including
filtering a position command to generate a filtered command, and
generating the drive signal using the filtered command, wherein
the filtering the position command to generate the filtered command includes
applying a band-stop filter and a low-pass filter having a variable cutoff frequency to the position command,
the method further comprises:
receiving an instruction from an outside; and
setting the cutoff frequency of the low-pass filter according to the instruction before the application of the low-pass filter to the position command,
the setting the cutoff frequency of the low-pass filter is to
set the cutoff frequency to a first frequency when an instruction to prioritize an operating speed out of suppression of vibration of the arm and the operating speed of the arm is received, and
set the cutoff frequency to a second frequency lower than the first frequency when an instruction to prioritize the suppression of vibration out of the suppression of vibration of the arm and the operating speed of the arm is received.

9. The method for controlling the robot according to claim 8, wherein
the receiving the instruction from the outside includes
displaying, on a display section, a user interface for designating whether or not to prioritize the suppression of vibration in the filtering, and
receiving, via the user interface, designation of whether or not to prioritize the suppression of vibration as at least a portion of the instruction.

10. The method for controlling the robot according to claim 9, wherein
the receiving the instruction from the outside includes
displaying, on the display section, a user interface for designating an allowable vibration amount, and
receiving, via the user interface, designation of the allowable vibration amount as at least a portion of the instruction to prioritize the suppression of vibration.

11. The method for controlling the robot according to claim 8, wherein
the receiving the instruction from the outside includes
displaying, on a display section, a user interface for designating at least one of an operating speed of the motor and a cycle time of work that the robot performs, and
receiving, via the user interface, at least one of designation of the operating speed of the motor and designation of the cycle time of the work that the robot performs as at least a portion of the instruction to prioritize the operating speed.

12. The method for controlling the robot according to claim 8, wherein
the robot includes a second motor that moves the arm according to a second drive signal,
the method further comprises performing, on the second motor, a second drive signal generation process including
filtering a second position command to generate a second filtered command, and
generating the second drive signal using the second filtered command,
the generating the second filtered command includes
applying a second band-stop filter and a second low-pass filter having a variable cut-off frequency to the second position command,
the method further comprises
setting the cutoff frequency of the second low-pass filter according to the instruction before the application of the second low-pass filter to the second position command, and
the setting the cutoff frequency of the second low-pass filter is to set the cutoff frequency of the second low-pass filter to a value equal to the cutoff frequency of the low-pass filter.

13. The method for controlling the robot according to claim 12, wherein
the motor is a main motor that moves the most in an operation to be performed by the arm,
the cutoff frequency of the low-pass filter is set according to the instruction in the setting of the cutoff frequency of the low-pass filter to be applied to the position command, and
the cutoff frequency of the second low-pass filter is set to a value equal to the cutoff frequency of the low-pass filter in the setting of the cutoff frequency of the second low-pass filter.

14. The method for controlling the robot according to claim 8, wherein
a cutoff frequency of the band-stop filter is not changed according to the instruction.

15. A non-transitory computer-readable storage medium storing a computer program for controlling, using a computer, a robot including an arm and a motor that moves the arm according to a drive signal, the computer program causing the computer to implement a function of executing, on the motor, functions of:
filtering a position command to generate a filtered command; and
generating the drive signal using the filtered command, wherein
the function of filtering the position command to generate the filtered command includes a function of applying a band-stop filter and a low-pass filter having a variable cutoff frequency to the position command, a function of receiving an instruction from an outside, and a function of setting the cutoff frequency of the low-pass filter according to the instruction before the application of the low-pass filter to the position command, the function of setting the cutoff frequency of the low-pass filter includes a function of setting the cutoff frequency to a first frequency when an instruction to prioritize an operating speed out of suppression of vibration of the arm and the operating speed of the arm is received, and setting the cutoff frequency to a second frequency lower than the first frequency when an instruction to prioritize the suppression of vibration out of the suppression of vibration of the arm and the operating speed of the arm is received.

* * * * *